(12) United States Patent
Stockmanns et al.

(10) Patent No.: US 7,743,314 B2
(45) Date of Patent: Jun. 22, 2010

(54) METHOD AND APPARATUS FOR A DATA-DEPENDENT NOISE PREDICTIVE VITERBI

(75) Inventors: Heinrich J. Stockmanns, Santa Cruz, CA (US); William G. Bliss, Thornton, CO (US); Razmik Karabed, San Jose, CA (US); James W. Rae, Rochester, MN (US)

(73) Assignee: Marvell International Ltd., Hamilton (BM)

( * ) Notice: Subject to any disclaimer, the term of this patent is extended or adjusted under 35 U.S.C. 154(b) by 828 days.

(21) Appl. No.: 11/607,492

(22) Filed: Dec. 1, 2006

(65) Prior Publication Data

US 2007/0076826 A1    Apr. 5, 2007

Related U.S. Application Data

(63) Continuation of application No. 10/402,654, filed on Mar. 28, 2003, now Pat. No. 7,522,678.

(60) Provisional application No. 60/374,854, filed on Apr. 18, 2002.

(51) Int. Cl.
*H03M 13/03*    (2006.01)
(52) U.S. Cl. .................. 714/796; 714/795
(58) Field of Classification Search .......... 714/796, 714/795
See application file for complete search history.

(56) References Cited

U.S. PATENT DOCUMENTS

| 5,003,617 | A |   | 3/1991  | Epsom et al. |
| 5,016,280 | A |   | 5/1991  | Engebretson et al. |
| 5,073,769 | A |   | 12/1991 | Kompelien |
| 5,257,182 | A |   | 10/1993 | Luck et al. |
| 5,418,795 | A | * | 5/1995  | Itakura et al. ............... 714/746 |
| 5,424,882 | A |   | 6/1995  | Kazawa |
| 5,446,746 | A | * | 8/1995  | Park .......................... 714/795 |

(Continued)

FOREIGN PATENT DOCUMENTS

DE     EP 0 871 170 A2    10/1998

(Continued)

OTHER PUBLICATIONS

"Exact Bounds for Viterbi Detector Path Metric Differences," Paul H. Siegel, C. Bernard Shung, Thomas D. Howell, Hermant K. Thapar, IBM Corporation, San Jose, CA.

(Continued)

*Primary Examiner*—M. Mujtaba K Chaudry

(57) ABSTRACT

An improved Viterbi detector is disclosed in which each branch metric is calculated based on noise statistics that depend on the signal hypothesis corresponding to the branch. Also disclosed is a method of reducing the complexity of the branch metric calculations by clustering branches corresponding to signals with similar signal-dependent noise statistics. A feature of this architecture is that the branch metrics (and their corresponding square difference operators) are clustered into multiple groups, where all the members of each group draw input from a single, shared noise predictive filter corresponding to the group. In recording technologies as practiced today, physical imperfections in the representation of recorded user data in the recording medium itself are becoming the dominate source of noise in the read back data. This noise is highly dependent on what was (intended to be) written in the medium. The disclosed Viterbi detector exploits this statistical dependence of the noise on the signal.

31 Claims, 16 Drawing Sheets

U.S. PATENT DOCUMENTS

| | | | | |
|---|---|---|---|---|
| 5,450,338 | A | * | 9/1995 | Oota et al. ............... 714/796 |
| 5,513,215 | A | | 4/1996 | Marchetto et al. |
| 5,530,707 | A | * | 6/1996 | Lin ............................ 714/792 |
| 5,563,864 | A | | 10/1996 | Kobayashi et al. |
| 5,581,581 | A | | 12/1996 | Sato |
| 5,588,027 | A | | 12/1996 | Lim |
| 5,625,505 | A | | 4/1997 | Ohmori et al. |
| 5,644,603 | A | | 7/1997 | Ushirokawa |
| 5,809,080 | A | | 9/1998 | Karabed et al. |
| 5,881,075 | A | * | 3/1999 | Kong et al. .............. 714/795 |
| 5,995,562 | A | * | 11/1999 | Koizumi ................... 714/795 |
| 6,097,769 | A | | 8/2000 | Sayiner et al. |
| 6,148,043 | A | | 11/2000 | Fujimoto |
| 6,148,431 | A | | 11/2000 | Lee et al. |
| 6,163,517 | A | | 12/2000 | Fujimoto |
| 6,178,053 | B1 | | 1/2001 | Narita |
| 6,199,191 | B1 | | 3/2001 | Iwata |
| 6,201,839 | B1 | | 3/2001 | Kavčić et al. |
| 6,201,840 | B1 | | 3/2001 | Rub et al. |
| 6,219,387 | B1 | | 4/2001 | Glover |
| 6,246,698 | B1 | * | 6/2001 | Kumar ...................... 370/487 |
| 6,278,568 | B1 | | 8/2001 | Cloke et al. |
| 6,301,684 | B1 | | 10/2001 | Watanabe et al. |
| 6,304,612 | B1 | * | 10/2001 | Baggen et al. ............. 375/262 |
| 6,334,201 | B1 | | 12/2001 | Sawaguchi et al. |
| 6,415,415 | B1 | * | 7/2002 | Karabed .................... 714/795 |
| 6,449,110 | B1 | | 9/2002 | DeGroat et al. |
| 6,460,150 | B1 | | 10/2002 | Cideciyan et al. |
| 6,581,184 | B1 | | 6/2003 | Saeki et al. |
| 6,667,841 | B2 | | 12/2003 | Taguchi et al. |
| 2001/0050926 | A1 | * | 12/2001 | Kumar ...................... 370/529 |
| 2002/0153955 | A1 | | 10/2002 | Gharpurey et al. |
| 2002/0184597 | A1 | | 12/2002 | Jeon et al. |

FOREIGN PATENT DOCUMENTS

| | | |
|---|---|---|
| GB | EP 1056 236 A2 | 11/2000 |

OTHER PUBLICATIONS

"A 100MBIT/S Viterbi Decoder Chip: Novel Architecture and its Realization," Gerhard Fettweis, Heinrich Meyr, ICC'90, paper No. 257, session 307A, Atlanta GA, USA, Apr. 16-19, 1990, p. 1-5.
"Where do we use Viterbi Decoder?" Opencores.org.
"A Tutorial on Convolutional Coding with Viterbi Decoding," Chip Fleming, Spectrum Applications, 1999, http://pw1.netcom.com/~chip.f/viterbi/tutorial.html.
"PRML: Seagate Uses Space Age Technology Today," http://www.seagate.com/support/kb/disc/prml.html.
"PRML," http://www.idema.org/about/industry/ind_tech_prml.html.
"Hard Disc Data Encoding and Decoding," http://www.storagereview.com/guide2000/ref/hdd/geom/data.html.
"Technical Requirments for Encoding and Decoding," http://www.storagereview.com/guide2000/ref/hdd/geom/dataRequirements.html.
"Run Length Limited (RLL)," http://www.storagereview.com/guide2000/ref/hdd/geom/dataRLL.html.
"Partial Response, Maximum Likelihood (PRML)," http://www.storagereview.com/guide2000/ref/hdd/geom/dataPRML.html.
"Extended PRML (EPRML)," http://www.storagereview.com/guide2000/ref/hdd/geom/dataEPRML.html.
"MR and PRML: Technologies in Synergy—How Advanced Head and Read Channel Technologies Work Together to Increase Capacity and Improve Performance of Desktop Drives—A Quantum White Paper," http://www.lionsgate.com/Home/baden/public_html_index/SCSI/Quantum_White_Papers/MR_Head/MR4/9/01.
"Western Digital Corporation—Glossary, Viterbi Detection," http://www.westerndigital.com/company/glossary.html.
"Description of the Algorithms (Part 1)," http://pw1.netcom.com/~chip.f/viterbi/algrthms.html.
"Synchronous Recording Channels—PRML," KnowledgeTek, Inc., 1999.
"A CMOS Continuous-Time Gm-C Filter for PRML Read Channel Applications at 150 Mb/s and Beyond," Iuri Mehr, David R. Welland, IEEE Journal of Solid State Circuits, vol. 32, No. 4, Apr. 1997.
"A Pipelined 16-State Generalized Viterbi Detector," L. Richard Carley and Srinath Sridharan, IEEE Transactions on Magnetics, vol. 34, No. 1, Jan. 1998.
"Reduced-Complexity Sequence Detection for $E^2PR4$ Magnetic Recording Channel," Borivoje Nikolie, Michale Leung, Leo Fu, Vojin G. Oklobdzja, Richard Yamasaki, General Conference (Part B), Global Telecommunications Conference—Globecom '99, vol. 1b pp. 960-964., 1999.
"A 50 Mbit/s Interative Turbo-Decoder," F. Viglione, G. Masera, G. Piccinini, M. Ruo Roch, M. Zamboni, Proceedings Design, Automation and Test in Europe Conference and Exhibition 200, Proceedings of Meeting on Design Automation and Test in Europe, Paris, France, 27-30, pp. 176-180, 2000.
International Search Report, International Application No. PCT/US 02/19093, pp. 1-2, Sep. 5, 2002.
Aleksandar Kavčić and José M. F. Moura, "Signal-Dependent Correlation-Sensitive Branch Metrics for Viterbi-like Sequence Detectors", Data Storage Systems Center, Carnegie Mellon University, Pittsburgh, PA, 0-7803-4788-9/98/$10.00 © 1998 IEEE, pp. 657-661.
Aleksandar Kavčić and José M. F. Moura, "Correlation-Sensitive Adaptive Sequence Detection", IEEE Transactions on Magnetics, vol. 34, No. 3, May 1998, pp. 763-770.
Charles W. Therrien, "Discrete Random Signals and Statistical Signal Processing", © 1992 by Prentice-Hall, Inc., ISBN 0-13-852112-3, chapters 7 & 8.
Chen et al., "Convolutional Coding System with Tone Calibrated Technique for Land Mobile Radio Communication", Sep. 1990, IEEE Conference, pp. 73-76.
Acampora, "Bit Error Rate Bounds for Viterbi Decoding with Modem Implementation Errors", IEEE Transactions on Communications, vol. Com-30, No. 1, Jan. 1982, pp. 129-134.
PCT International Search Report PCT/EP 03/03843.
Doherty et al., "An Adaptive Algorithm for Stable Decision-Feedback Filtering", Jan. 1993, IEEE Publication, vol. 40, No. 1, pp. 1-9.
Noriega et al., "Adaptive Estimation of Noise Covariance Matrices in Real-Time Preprocessing of Geophysical Data", Sep. 1997, IEEE Publication, vol. 35, No. 5, pp. 1146-1159.
Herrick et al., "Correlated Frequency Hopping: An Improved Approach to HF Spread Spectrum Communications", 1996, IEEE Publication, pp. 319-324.
Crosetto, "Real-Time Programmable, Digital Signal-Processing Electronics for Extracting the Information from a Detector Module for Multi-Modularity PET-SPECT/CT Scanners", Oct. 2000, IEEE Publication, vol. 2, pp. 69-76.

\* cited by examiner

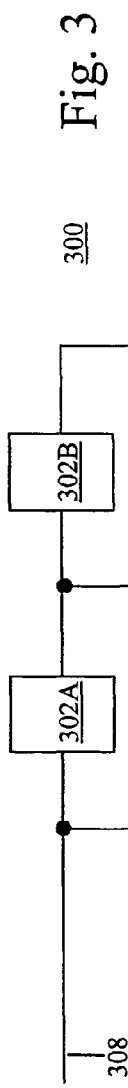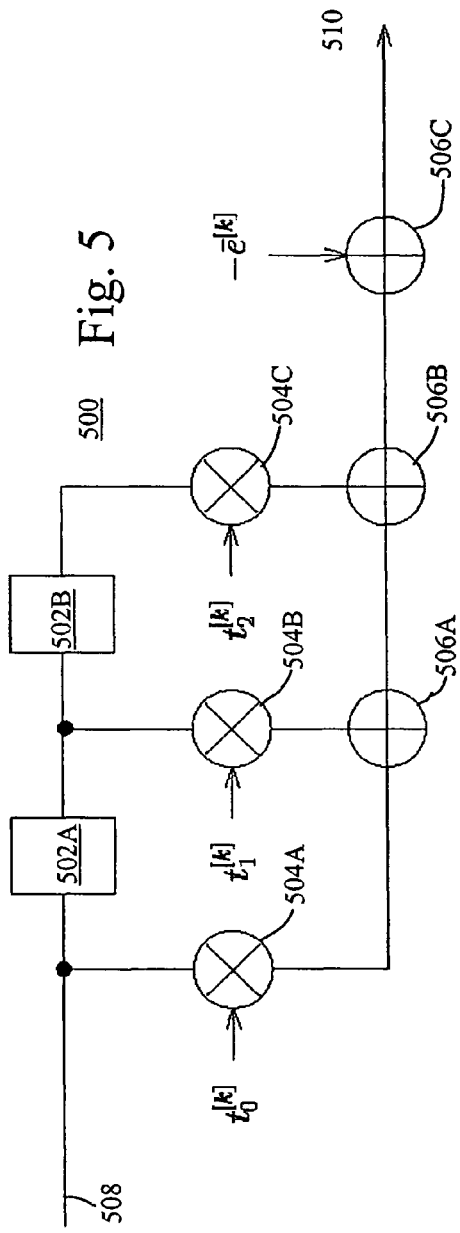

BMU for stationary noise

BMU for signal dependent noise

1400

METHOD AND APPARATUS FOR A DATA-DEPENDENT NOISE PREDICTIVE VITERBI

RELATED APPLICATIONS

This application is a continuation under 37 C.F.R. §1.53(b) of U.S. patent application Ser. No. 10/402,654 filed Mar. 28, 2003 now U.S. Pat. No. 7,522,678, the entire disclosure of which is hereby incorporated by reference.

U.S. patent application Ser. No. 10/402,654 claims the benefit of the filing date pursuant to 35 U.S.C. §19(e) of Provisional Application Ser. No. 60/374,854, filed Apr. 18, 2002, the disclosure of which is hereby incorporated by reference.

The following co-pending and commonly assigned U.S. patent application has been filed on the same date as the U.S. patent application Ser. No. 10/402,654. This application relates to and further describes other aspects of the embodiments disclosed in the present application and is herein incorporated by reference.

U.S. patent application Ser. No. 6,889,154, "METHOD AND APPARATUS FOR CALIBRATING DATA-DEPENDENT NOISE PREDICTION", filed herewith.

BACKGROUND

Computer hard disk drives, also known as fixed disk drives or hard drives, have become a de facto standard data storage component of modern computer systems and are making further inroads into modern consumer electronics as well. Their proliferation can be directly attributed to their low cost, high storage capacity and high reliability, in addition to wide availability, low power consumption, high data transfer speeds and decreasing physical size.

These disk drives typically consist of one or more rotating magnetic platters encased within an environmentally controlled housing that further includes all of the electronics and mechanics to read and write data and interface with other devices. Read/write heads are positioned above each of the platters, and typically on each face, to record and read data. The electronics of a hard disk drive are coupled with these read/write heads and include numerous components to control the position of the heads and generate or sense the electromagnetic fields representing data. These components receive data from a host device, such as a personal computer, and translate that data into magnetic encodings written onto the disk platters by the heads. Further, when a host device requests data from the drive, the electronics locates the desired data, senses the magnetic encodings which represent that data and translates those encodings back into the binary digital information which the host device can understand. Further, error detection and correction algorithms are applied to ensure accurate storage and retrieval of data.

One area in which significant advancements have been made has been in the area of read/write head technology and the methods of interpreting the magnetic fluctuations sensed by these heads. The read/write head, of which a typical hard disk has several, is the interface between magnetic platters and the disk drive electronics. The read/write head actually reads and writes the magnetically encoded data as areas of magnetic flux on the platters. Data, consisting of binary 1's and 0's, are encoded by sequences of the presence or absence of flux reversals recorded or detected by the read/write head. A flux reversal is a change in the magnetic flux in two contiguous areas of the disk platter. Traditional hard drives read data off the platters by detecting the voltage peak imparted in the read/write head when a flux reversal passes underneath the read/write head as the platters rotate. This is known as "peak detection." However, increasing storage densities require reduced peak amplitudes and better signal discrimination and higher platter rotational speeds are pushing the peaks closer together thus making peak detection more difficult to accomplish.

Magneto-resistive ("MR") read/write heads have been developed with increased sensitivity to sense smaller amplitude magnetic signals and with increased signal discrimination to address some of the problems with increasing storage densities. In addition, another technology, known as Partial Response Maximum Likelihood ("PRML"), has been developed to further address the problems with peak detection as densities and rotational speeds increase. Borrowed from communications technology, PRML is an algorithm implemented in the disk drive electronics to interpret the magnetic signals sensed by the read/write heads. PRML-based disk drives read the analog waveforms generated by the magnetic flux reversals stored on the disk. However, instead of looking for peak values to indicate flux reversals, PRML-based drives digitally sample this analog waveform (the "Partial Response") and use advanced signal processing technologies to determine the bit pattern represented by that wave form (the "Maximum Likelihood"). This technology, in conjunction with magneto-resistive ("MR") heads, have permitted manufacturers to further increase data storage densities. PRML technology further tolerates more noise in the sensed magnetic signals permitting the use of lower quality platters and read/write heads which increases manufacturing yields and lowers costs.

With many different drives available from multiple manufacturers, hard disk drives are typically differentiated by factors such as cost/megabyte of storage, data transfer rate, power requirements and form factor (physical dimensions) with the bulk of competition based on cost. With most competition between hard disk drive manufacturers coming in the area of cost, there is a need for enhanced hard disk drive components which prove cost effective in increasing supplies and driving down manufacturing costs all while increasing storage capacity, operating speed, reliability and power efficiency.

SUMMARY

The present invention is defined by the following claims, and nothing in this section should be taken as a limitation on those claims. By way of introduction, the preferred embodiments described below relate to a Viterbi detector for converting a digital binary stream representing a partial response signal into a digital binary output representative thereof. The Viterbi detector includes a branch metric unit ("BMU") operative to receive the digital binary stream and compute at least one branch metric value and at least one first state metric value, the BMU including a plurality of branch metric sets, each of the plurality of branch metric sets comprising a plurality of branch metrics, and a plurality of noise predictive filters, each of the plurality of noise predictive filters coupled with one of the plurality of branch metric sets. The Viterbi detector further includes an add compare select unit ("ACSU") coupled with the BMU and operative to receive the at least one branch metric value the at least one first state metric value and generate at least one second state metric value and a survivor memory unit coupled with the ACSU and operative to select one of the at least one second state metric value and generate the digital binary output therefrom.

The preferred embodiments further relate to a method for converting a digital binary stream representing a partial response signal into a digital binary output representative thereof. In one embodiment, the method includes receiving the digital binary stream, computing at least one branch metric value and at least one first state metric value based on the digital binary stream using a plurality of branch metric sets, each of the plurality of branch metric sets comprising a plurality of branch metrics and a plurality of noise predictive filters, each of the plurality of noise predictive filters coupled with one of the plurality of branch metric sets, generating at least one second state metric value based on the at least one branch metric value and the at least one first state metric value, selecting one of the at least one second state metric value and generating the digital binary output therefrom.

Further aspects and advantages of the invention are discussed below in conjunction with the preferred embodiments.

BRIEF DESCRIPTION OF THE DRAWINGS

FIG. 3 depicts a block diagram of an exemplary FIR filter for use with the Viterbi detector of FIG. 2.

FIG. 5 depicts a block diagram of a FIR filter for use with the Viterbi detector of FIG. 2 according to one embodiment.

DETAILED DESCRIPTION OF THE PRESENTLY PREFERRED EMBODIMENTS

The embodiments described herein relate to a PRML-based read/write channel device for hard disk drive controllers. The read/write channel is a device coupled with the read/write heads of the hard disk drive. Herein, the phrase "coupled with" is defined to mean directly connected to or indirectly connected with through one or more intermediate components. Such intermediate components may include both hardware and software based components. The read/write channel converts binary/digital data from the host device into the electrical impulses which drive the read/write head to magnetically record the data to the disk drive platters. Further, the read/write channel receives the analog waveform magnetically sensed by the read/write heads and converts that waveform back into the binary/digital data stored on the drive.

Figure 1A:
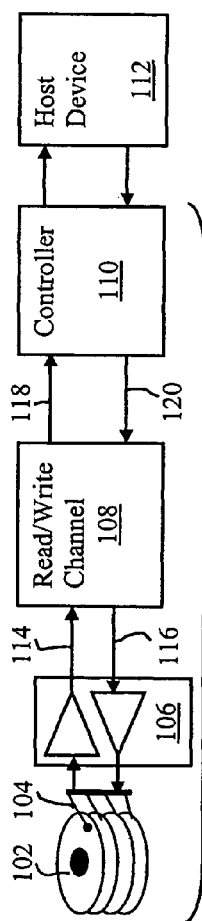
FIG. 1A depicts block diagram of an exemplary hard disk drive coupled with a host device.

Referring to FIG. 1A, there is shown a block diagram of an exemplary hard disk drive 100 coupled with a host device 112. For clarity, some components, such as the servo/actuator motor control, are not shown. The drive 100 includes the magnetic platters and spindle motor 102, the read/write heads and actuator assembly 104, pre-amplifiers 106, a read/write channel 108 and a controller 110. The pre-amplifiers 106 are coupled with the read/write channel 108 via interfaces 114, 116. The controller 110 interfaces with the read/write channel 108 via interfaces 118, 120.

For reads from the hard disk 100, the host device 112 provides a location identifier which identifies the location of the data on the disk drive, e.g. a cylinder and sector address. The controller 110 receives this address and determines the physical location of the data on the platters 102. The controller 110 then moves the read/write heads into the proper position for the data to spin underneath the read/write heads 104. As the data spins underneath the read/write head 104, the read/write head 104 senses the presence or absence of flux reversals, generating a stream of analog signal data. This data is passed to the pre-amplifiers 106 which amplifies the signal and passes it to the read/write channel 108 via the interface 114. As will be discussed below, the read/write channel receives the amplified analog waveform from the pre-amplifiers 106 and decodes this waveform into the digital binary data that it represents. This digital binary data is then passed to the controller 110 via the interface 118. The controller 110 interfaces the hard drive 100 with the host device 112 and may contain additional functionality, such as caching or error detection/correction functionality, intended to increase the operating speed and/or reliability of the hard drive 100.

For write operations, the host device 112 provides the controller 110 with the binary digital data to be written and the location, e.g. cylinder and sector address, of where to write it. The controller 110 moves the read/write heads 104 to the proper location and sends the binary digital data to be written to the read/write channel 108 via interface 120. The read/write channel 108 receives the binary digital data, encodes it and generates analog signals which are used to drive the read/write head 104 to impart the proper magnetic flux reversals onto the magnetic platters 102 representing the binary digital data. The generated signals are passed to the pre-amplifiers 106 via interface 116 which drive the read/write heads 104.

Figure 1B:
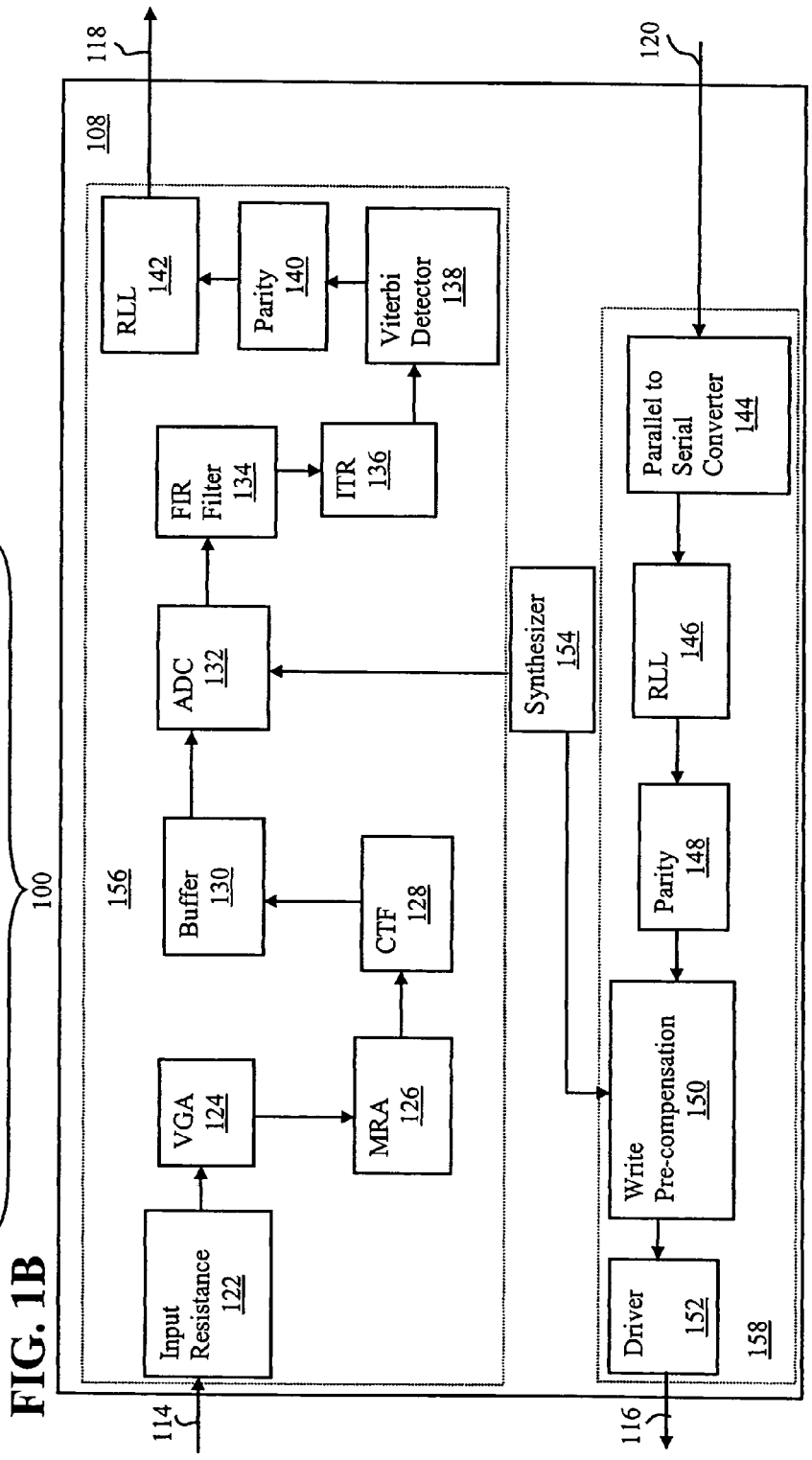
FIG. 1B depicts a block diagram of read/write channel for use with the disk drive of FIG. 1A.

Referring to FIG. 1B, there is shown an exemplary read/write channel 108 supporting Partial Response Maximum Likelihood ("PRML") encoding technology for use with the hard disk drive 100 of FIG. 1A. For clarity, some components have been omitted. The read/write channel 108 is implemented as an integrated circuit using a complementary metal oxide semiconductor ("CMOS") process at 0.18 micron. It will be appreciated that CMOS processes include processes which use metal gates as well as polysilicon gates. It will further be appreciated that other process technologies and feature sizes may be used and that the circuitry disclosed herein may be further integrated with other circuitry comprising the hard disk electronics such as the hard disk controller logic. As was described, the read/write channel 108 converts between binary digital information and the analog signals representing the magnetic flux on the platters 102. The read/write channel 108 is divided into two main sections, the read path 156 and the write path 158.

The write path 158 includes a parallel-to-serial converter 144, a run-length-limited ("RLL") encoder 146, a parity encoder 148, a write pre-compensation circuit 150 and a driver circuit 152. The parallel-to-serial converter 144 receives data from the host device 112 via interface 120 eight bits at a time. The converter 144 serializes the input data and sends the serial bit stream to the RLL encoder 146. The RLL encoder 146 encodes the serial bit stream into symbolic binary sequences according to a known run-length limited algorithm for recording on the platters 102. The exemplary RLL encoder uses a 32/33 bit symbol code to ensure that flux reversals are properly spaced and that long runs of data without flux reversals are not recorded. The RLL encoded data is then passed to the parity encoder 148 which adds a parity bit to the data. In the exemplary parity encoder 148, odd parity is used to ensure that long run's of 0's and 1's are not recorded due to the magnetic properties of such recorded data. The parity encoded data is subsequently treated as an analog signal rather than a digital signal. The analog signal is passed to a write pre-compensation circuit 150 which dynamically adjusts the pulse widths of the bit stream to account for magnetic distortions in the recording process. The adjusted analog signal is passed to a driver circuit 152 which drives the signal to the pre-amplifiers 106 via interface 116 to drive the read/write heads 104 and record the data. The exemplary driver circuit 152 includes a pseudo emitter coupled logic ("PECL") driver circuit which generates a differential output to the pre-amplifiers 106.

The read path 156 includes an attenuation circuit/input resistance 122, a variable gain amplifier ("VGA") 124, a magneto-resistive asymmetry linearizer ("MRA") 126, a continuous time filter ("CTF") 128, a buffer 130, an analog to digital converter ("ADC") 132, a finite impulse response ("FIR") filter 134, an interpolated timing recovery ("ITR") circuit 136, a Viterbi algorithm detector 138, a parity decoder 140 and a run-length-limited ("RLL") decoder 142. The amplified magnetic signals sensed from the platters 102 by the read/write head 104 are received by the read/write channel 108 via interface 114. The analog signal waveform representing the sensed magnetic signals is first passed through an input resistance 122 which is a switching circuit to attenuate the signal and account for any input resistance. The attenuated signal is then passed to a VGA 124 which amplifies the signal. The amplified signal is then passed to the MRA 126 which adjusts the signal for any distortion created by the recording process. Essentially, the NRA 126 performs the opposite function of the write-pre-compensation circuit 150 in the write path 158. The signal is next passed through the CTF 128, which is essentially a low pass filter, to filter out noise. The filtered signal is then passed to the ADC 132 via the buffer 130 which samples the analog signal and converts it to a digital form. The digital signal is then passed to a FIR filter 134 and then to a timing recovery circuit 136. The timing recovery circuit 136 is connected (not shown in the figure) to the FIR filter 134, the MRA 126 and the VGA 124 in a feedback orientation to adjust these circuits according to the signals received to provide timing compensation. The exemplary FIR filter 134 is a 10 tap FIR filter. The digital signal is then passed to the Viterbi algorithm detector 138 which determines the binary bit pattern represented by the digital signal using digital signal processing techniques. The exemplary Viterbi algorithm detector 138 uses a 32 state Viterbi processor. The binary data represented by the digital signal is then passed to the parity decoder 140 which removes the parity bit and then to the RLL decoder 142 which decodes the binary RLL encoding symbols back into the actual binary data that they represent. This data is then passed to the controller 110 via the interface 118.

The read/write channel 108 further includes a clock synthesizer 154. The clock synthesizer 154 generates the clock signals required for operating the read/write channel 168. The exemplary clock synthesizer 154 includes a phased lock loop ("PLL") (not shown) with a voltage controlled oscillator and various clock dividers to generate the necessary frequencies.

Figure 2:
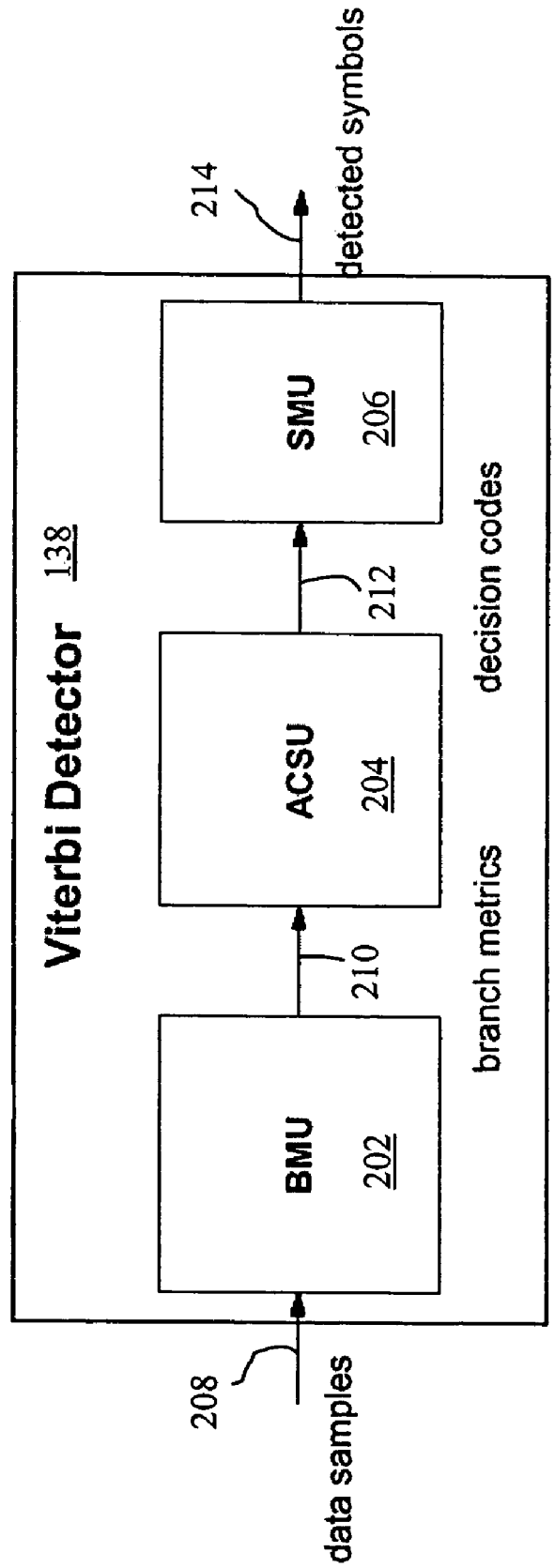
FIG. 2 depicts a block diagram of an exemplary Viterbi detector according to one embodiment.

In accordance with one preferred embodiment, a method and apparatus for a noise predictive Viterbi detector 138 is described. The Viterbi detector 138 is a maximum likelihood detector or Viterbi decoder implementing the Viterbi algorithm for analyzing the partial response signal provided by the discrete, equalized signal of the FIR filter 134 and the ITR circuit 136, as illustrated in FIGS. 1B and 2. The Viterbi detector 138 generates a digital binary data output signal in response which is received by the parity decoder 140. In performing maximum likelihood detection, the Viterbi algorithm provides an iterative method for determining the best path along branches of a trellis diagram. The maximum likelihood detection involves analyzing a number of consecutive data samples to determine the most likely path. Thus, by analyzing a number of consecutive samples, the most likely sequence can be chosen. The Viterbi detector 138 implements a predetermined trellis diagram by having a given number of states, wherein for each state, the Viterbi detector 138 determines a branch metric value for each branch entering the state, a state metric value, and a survivor branch. In order to accomplish this task, the Viterbi detector 138 includes a branch metric unit (BMU) 202, an add-compare-select unit (ACSU) 204, and a survivor memory unit (SMU) 206, as illustrated in FIG. 2. An example of one implementation of a Viterbi detector is described in greater detail in a paper entitled "A 100 MBIT/S Viterbi Detector Chip: Novel Architecture And Its Realization," written by Gerhard Fettweis and Heinrich Meyr, presented to the ICC in 1990, in Atlanta, Ga., on Apr. 16-19, 1990, given paper no. 257, at session 307A, the entire disclosure of which is incorporated herein by reference.

For simplicity, the following description of the Viterbi detector 138 will be limited to describing only one state, even though the Viterbi detector 138 may have more than one state, as known by those skilled in the art. In one preferred embodiment, the Viterbi detector is a 32 state detector wherein each state comprises 4 bits.

During a read cycle, the branch metric unit 202 receives a stream of binary digital data 208 from the FIR filter 134 and the ITR circuit 136, determines a branch metric value (Q) for each state at a time k+1, and outputs the branch metric value (Q) for time k+1 within a branch metric signal 210. The branch metric signal 210 includes the branch metric value (Q) for each discrete, equalized value of the binary data 208. The branch metric value (Q) is provided in a binary representation, and has a length of (g) bits. The branch metric value (Q) may be calculated using any one of a number of algorithms commonly used for calculating branch metric values.

The branch metric signal 202 containing the branch metric value (Q) for time k+1 is then input into the ACSU 204 along with a state metric signal (not shown) containing a state metric value (M) for time k. The ACSU 204 includes an adding unit, a comparator, a selector, and a latch, all not shown. At any time k, the state metric value (M) indicates a cost associated with the best path through the trellis diagram to the state, and is therefore a measure for the likelihood of this particular path. Preferably, the state metric value (M) is stored in a memory device, such as the latch (not shown). If a latch is used to store the state metric value (M), the latch must be able to store g+h binary bits.

The adding unit of the ACSU, details not shown in figures, adds the branch metric value (Q) for time k+1 for a given state to the state metric value (M) for time k for a given state to obtain a state metric value (M) for time k+1 for a given state. The state metric value (M) for time k is stored in the latch in the ACSU 204, and received by the adding unit. The adding unit outputs the state metric value (M) for time k+1 for a given state to the comparator and the selector. Typically, more than one state metric value (M) for time k+1 exists for any given state, and all these values are output by the adding unit. The comparator receives the output of the adding unit containing all the state metric values (M) for time k+1 for a given state and then compares all the state metric values (M) for time k+1 for the given state. The comparator then generates a control input for the selector. Additionally, the comparator outputs a control signal which is received by the SMU 206. The selector receives the control input from the comparator and the output from the adding unit containing all the state metric values (M) for time k+1 for a given state, and selects a state metric value (M) for time k+1, which is then stored in the latch. Preferably, the selector selects the largest state metric value (M) for time k+1 for a given state, and outputs that value to the latch.

The survivor memory unit (SMU) 206 receives and processes the control signal 212 from the ACSU 204, and more particularly from the comparator in the ACSU 234. The SMU 206 processes the signal received from the ACSU 204, and generates a digital binary data output signal in response which is received by the parity decoder 140, as illustrated in FIG. 1B. For more detail, refer to U.S. patent application Ser. No. 09/896,134, entitled "METHOD AND APPARATUS FOR VITERBI DETECTOR STATE METRIC RE-NORMALIZATION", filed Jun. 29, 2001, which discloses a method and apparatus for Viterbi detector state metric renormalization.

The method includes fabricating a Viterbi detector (138) having a predetermined number of states, wherein the Viterbi detector (138) stores a state metric value and a branch metric value for each state, and wherein the Viterbi detector (138) implements a trellis diagram. The method includes constructing a Viterbi detector (138) which can support a state metric value having g+h' number of bits. The number of bits needed to represent the branch metric value is represented by (g) and the additional number of bits needed to represent the state metric value is represented by (h'). The additional number of bits (h') is less than the additional number of bits (h) determined using the following inequality: $2^{h'-1}-h \geq K-1$, wherein K represent the constraint length of the trellis diagram.

The present invention is defined by the following claims, and nothing in this section should be taken as a limitation on those claims. By way of introduction, the preferred embodiments described below relate to a method for fabricating a Viterbi detector having a predetermined number of states, wherein the Viterbi detector stores a state metric value and a branch metric value for each state, and wherein the Viterbi detector implements a trellis diagram. The method includes constructing a Viterbi detector which can support a state metric value having g+h' number of bits. The number of bits needed to represent the branch metric value is represented by (g) and the additional number of bits needed to represent the state metric value is represented by (h'). The additional number of bits (h') is less than the additional number of bits (h) determined using the following inequality: $2^{h'-1}-h \geq K-1$, wherein K represent the constraint length of the trellis diagram.

The preferred embodiments further relate to a Viterbi detector having a predetermined number of states for conducting maximum likelihood sequence estimation for a predetermined stream of binary data, wherein the Viterbi detector stores a state metric value and a branch metric value for each state, and wherein the Viterbi detector implements a trellis diagram. The Viterbi detector includes a branch metric unit which receives the stream of binary data, determines a branch metric value for each state at a time k+4, and outputs the branch metric value for time k+1. The Viterbi detector also includes an adding unit which receives the branch metric value for time k+1 and adds the branch metric value to a state metric value for time k for each state. The state metric value is represented by a number of bits (g+h'), wherein g is the number of bits needed to represent the branch metric value, and wherein h' is the additional number of bits needed to represent the state metric value. The additional number of bits (h') is less than the additional number of bits (h) determined using the following inequality: $2^{h'-1}-h \geq K-1$, wherein K represents the constraint length of the trellis diagram. Further aspects and advantages of the invention are discussed below in conjunction with the preferred embodiments.

The branch metric signal 225 containing the branch metric value (Q) for time k+1 is input into the ACSU 226 along with a state metric signal 227 containing a state metric value (M) for time k. At any time k, the state metric value (M) indicates a cost associated with the best path through the trellis diagram to the state, and is therefore a measure for the likelihood of this particular path. Preferably, the state metric value (M) is stored in a memory device, such as a latch 232. If latch 232 is used to store the state metric value (M), the latch 232 must be able to store g+h binary bits. The ACSU 226 includes an adding unit 200, a comparator 234, a selector 236, and a latch 232, as illustrated in FIG. 1D.

The adding unit 200 is illustrated in more detail in FIG. 2, and described in more detail below. The adding unit 200 adds the branch metric value (Q) for time k+1 for a given state to the state metric value (M) for time k for a given state to obtain a state metric value (M) for time k+1 for a given state. The state metric value (M) for time k is stored in latch 232, and received by adding unit 200, as illustrated in FIG. 1D. The adding unit 200 outputs the state metric value (M) for time k+1 for a given state to the comparator 234 and the selector 236. Typically, more than one state metric value (M) for time k+1 exists for any given state, and all these value are output by the adding unit 200. The comparator 234 receives the output of the adding unit 200 containing all the state metric values (M) for time k+1 for a given state and then compares all the state metric values (M) for time k+1 for the given state. The comparator 234 then generates a control input 241 for the selector 236. Additionally, the comparator 234 outputs a control signal 243 which is received by the SMU 228. The selector 236 receives the control input 241 from the comparator 234 and the output from the adding unit 200 containing all the state metric values (M) for time k+1 for a given state, and selects a state metric value (M) for time k+1, which is then stored in latch 232. Preferably, the selector 236 selects the largest state metric value (M) for time k+1 for a given state, and outputs that value to the latch 232.

Figure 1C:
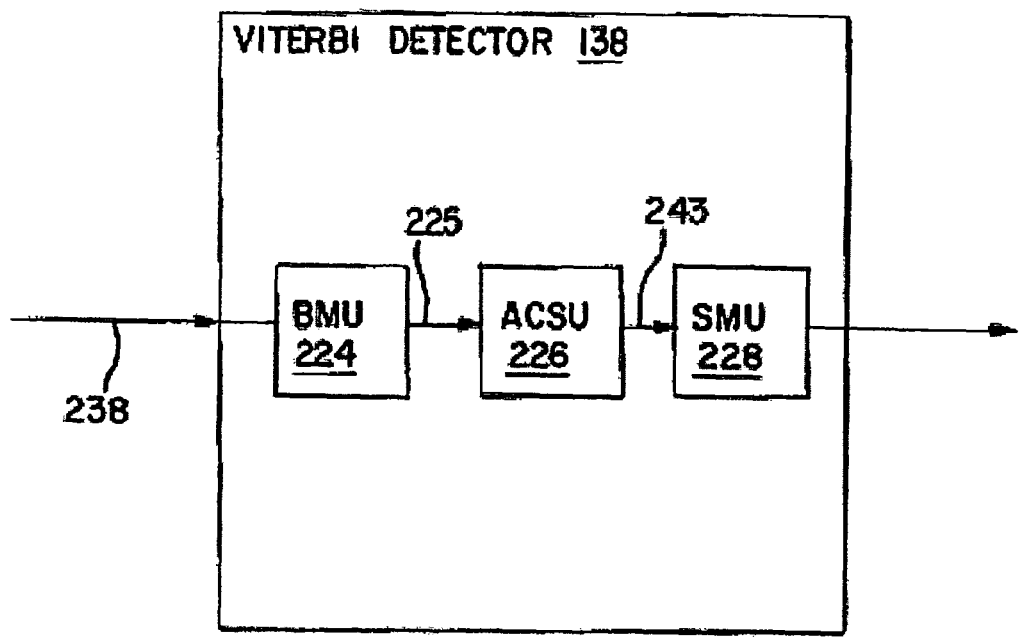
FIG. 1C depicts a block diagram of a Viterbi detector for use with the read/write channel of FIG. 1B.
Figure 1D:
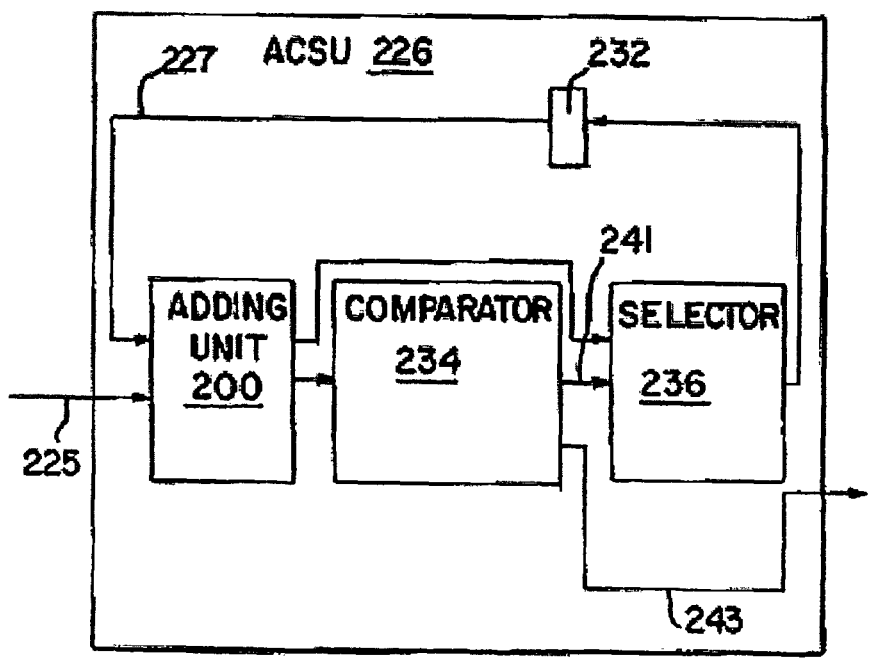
FIG. 1D depicts a block diagram of an Add-Compare-Select Unit for use with the Viterbi detector of FIG. 1C.

The survivor memory unit (SMU) 228 receives and processes the control signal 243 from the ACSU 226, and more particularly from the comparator 234, as illustrated in FIG. 1C. The SMU 228 processes the signal received from the ACSU 226, and generates a digital binary data output signal in response which is received by the parity decoder 140.

Figure 16:
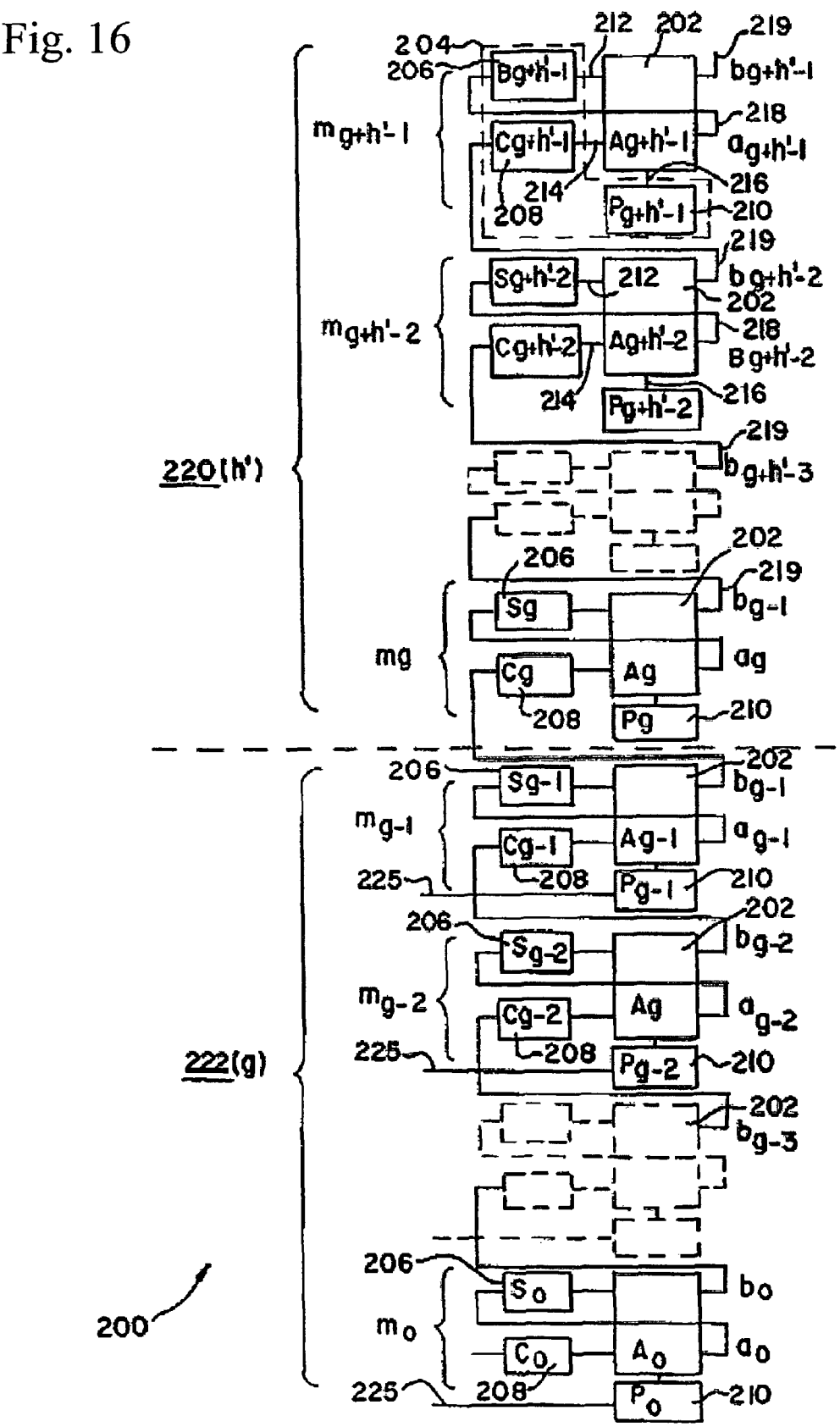
FIG. 16 depicts a block diagram of an adder for use with the Add-Compare-Select Unit of FIG. 1D.

FIG. 16 illustrates a portion of the adding unit 200. The adding unit 200 comprises adders ($A_i$) 202, S Latches ($S_i$) 206, C Latches ($C_i$) 208, and P Latches ($P_i$) 210. The adding unit 200 receives the branch metric value (Q) for time k+1 and adds the branch metric value (Q) for time k+1 to the state metric value (M) for time k for each state, wherein the state metric value (M) is represented by a number of bits (g+h), wherein g is the number of bits needed to represent the branch metric value and wherein h is the additional number of bits needed to represent the state metric value. Typically, the additional number of bits (h) is determined using the following inequality:

$$2^{h-1} - h \geq K - 1, \qquad [1]$$

wherein K represent the constraint length of the trellis diagram. Since K is a value that is known for a given Viterbi detector, h can be determined using inequality [1].

The operation of the addition unit 200 is as follows. The branch metric value (Q) is a non-negative integer provided in a binary representation. The binary representation of the branch metric value (Q) is given by $[m_0, m_1, m_2, \ldots, m_{g-1}]$, $m_i \in \{0,1\}$, where:

$$Q = \sum_{i=0}^{L} 2^i \times m_i. \qquad [2]$$

The state metric value (M) is provided in a carry save representation. The carry save representation of the state metric value (M) is given by be represented by a carry save representation $[(m1_0, m2_0), (m1_1, m2_1), \ldots, (m1_{g+h-1}, m2_{g+h-1})]$, $m1_i$; and $m2_i \in \{0,1\}$, where:

$$M = \sum_{i=0}^{L} 2^i \times (m1_i + m2_i). \qquad [3]$$

While the binary representation of the branch metric value (Q) is unique, in general, the carry save representation of the state metric value (M) is not unique.

The values for $m1_i$, which are also known as save bits ($s_i$), are stored in S Latches 206, as illustrated in FIG. 2. The values for $m2_i$, which are also known as carry bits ($c_i$), are stored in C Latches 208, as illustrated in FIG. 2. The save bits ($s_i$) and the carry bits ($c_i$) represent the state metric value (M). Additionally, the values for $m_i$, which are also known as binary bits ($p_i$), which represent the branch metric value (Q), are stored in P Latches 210.

The addition unit 200 adds the branch metric value (Q) for a particular state for time k+1 to the state metric value (M) for a particular state for time k, in order to arrive at a state metric value (M) for a particular state for time k+1, as illustrated in FIG. 2. The addition unit 200 comprises a top set 220 and a bottom set 222 of adders 202 ranging from $A_0$ to $A_{g+h-1}$, that is, the addition unit 200 comprises g+h adders 202. Adders 202 may be full adders or half adders, as described below. More specifically, the top set 220 includes h number of adders ($A_i$) 202 ranging from $A_g$ to $A_{g+h-1}$, and the bottom set (g) 222 includes g number of adders ($A_i$) 202 ranging from $A_0$ to $A_{g-1}$, as illustrated in FIG. 2. Every adder ($A_i$) 202 has at least two latches: an S latch ($S_i$) 206, and a C latch ($C_i$) 208. Therefore there are also g+h number of S latches ($S_i$) 206 and g+h number of C latches ($C_i$) 208. Additionally, every full adder has a P latch ($P_i$) 210. Therefore there are at least g number of P latches ($P_i$) 210. The input latches 204 include S latch ($S_i$) 206, C latch ($C_i$) 208, and P latch ($P_i$) 210 that provide an s input 212, a c input 214, and a p input 216 to each full adder 202, respectively. In addition, every adder ($A_i$) 202 has a first output ($a_i$) 218 and a second output ($b_i$) 219. The outputs ($a_i$, $b_i$) 218, 219 are generated as follows:

$$a_i = s_i \oplus c_i \oplus p_i; \text{ and} \qquad [4]$$

$$b_i = (s_i \otimes c_i) \vee (s_i \otimes p_i) \vee (c_i \otimes p_i), \qquad [5]$$

wherein $\oplus$, $\vee$, and $\otimes$ denote EXCLUSIVE OR, OR, and AND operations, respectively.

The adders ($A_i$) 202 in the top set 220 may be half adders, since no binary bits ($p_i$) are input into the P Latches 210 of the top set 220, and thus the P latches 210 of the top set 220 are not required.

If we let T to denote a discrete time sequence. And for $0 \leq i \leq g+h-1$, let $s_i(k)$, $c_i(k)$, and $p_i(k)$, stand for the values of s input 212, c input 214, and p input 216 which are then the outputs of S latch ($S_i$) 206, C latch ($C_i$) 208, and P latch ($P_i$) 210 at time T=k, respectively. Also if we let L1 and L2 to be defined as follows:

$$L1(k) = [(s_0(k), c_0(k)), (s_1(k), c_1(k)), \ldots, (s_{g+h-1}(k), c_{g+h-1}(k))], \text{ and} \qquad [6]$$

$$L2(k) = [p_0(k), p_1(k), \ldots, p_{g+h-1}(k)] \qquad [7]$$

We will use L1(L2) to also represent an integer number corresponding to L1(L2) above. Now, referring to FIG. 2, the addition of state metric value (M) and branch metric value (Q) is performed. First, at time T=0, the input latches 204 are set such that:

$$L1(0) = [(m1_0, m2_0), (m1_1, m2_1), \ldots, (m1_{g+h-1}, m2_{g+h-1})], \text{ and} \qquad [8]$$

$$L2(0) = [q_0, q_1, \ldots, q_{g-1}, 0, \ldots, 0]. \qquad [9]$$

Upon setting the input latches 204, the addition unit 200 generates the first output ($a_i$) 218 and the second output ($b_i$) 219, for $0 \leq i \leq g+h-1$. Next, the addition unit 200 latches these values at time T=1 such that:

$$s_i(1) = a_i, \text{ for } 0 \leq i \leq g+h-1, \qquad [10]$$

$$c_i(1) = b_{i-1}, \text{ for } 1 \leq i \leq g+h-1, \text{ and} \qquad [11]$$

$$c_0(1) = 0. \qquad [12]$$

If the second output ($b_{g+h-1}$) 219 equals zero, then L1(1)=M+Q, otherwise the second output ($b_{g+h-1}$) 219 equals one, and we have an "addition overflow" condition.

During a cumulative addition of state metric value (M) and branch metric value (Q), if we let L1(0)=M, L2(0)=Q1, L2(1)=Q2, ..., and L2(k−1)=Qk, we will generate L1(1)−L1(k) using the addition unit 200. Moreover, assuming that input latches ($S_i$'s, $C_i$'s, and $P_i$'s) 204 all latch just prior to each time T, then:

$$L1(i) = M + Q1 + \ldots + Qi, \text{ for } 1 \leq i \leq k. \qquad [13]$$

We now arrive at the following three propositions.

Proposition A:

If we assume that during a cumulative addition process $(s_i, c_i) = (1,1)$ at time T=k, for some integer, k, and some $g \leq i \leq g+h-1$, then at a time T=j, wherein j=k−(i−g+1), we would have:

$$[(s_g(j), c_g(j)), (s_{g+1}(j), c_{g+1}(j)), \ldots, (s_i(j), c_i(j))] = [(1,0), (1,0), \ldots, (1,0)] \qquad [14]$$

and at time T=j, wherein k−i+g≦j≦k, we would have:

$$[(s_w(j),c_w(j)),(s_{w+1}(j),c_{w+1}(j)),\ldots,(s_i(j),c_i(j))] = [(1,1),(1,0),\ldots,(1,0)],$$ [15]

where w=j−k+1.

Proposition B:

If we also assume that in a cumulative addition process, starting with M=0, we let $E_{min}$ to denote the minimum number represented by L1(k), over all time T=k, such that:

$$(m1_{g+h-1},m2_{g+h-1}) = (1,1),$$ [16]

then, we would have:

$$E_{min} \geq 2^{g+h}.$$ [17]

Proposition C:

Finally, if we assume that in a cumulative addition process, starting with M=0, we let $F_{max}$ to denote the maximum number represented by L1(k) over all k such that:

$$(m1_{g+h-1},m2_{g+h-1}) = (0,0)$$ [18]

then, we would have:

$$F_{max} \leq 2^{g+1} - 3 + 2^{g+h-1} - 2^g + (h-1) \times Q_{max},$$ [19]

where $Q_{max}$ is an upper bound to Qi's. If Qi's are unrestricted then $Q_{max}$ is $2^g-1$.

Equation [19], and thus Proposition C, may be proved, without loss of generality, by assuming $(m1_{g+h-2}, m2_{g+h-2}) = (1,1)$. We then let time T=k* to denote a time T when $F_{max}$ is achieved. Using Proposition A, at time T=k*−(h−1), we then have:

$$[(s_g(j),c_g(j)),(s_{g+1}(j),c_{g+1}(j)),\ldots,(s_{g+h-2}(j),c_{g+h-2}(j))] = [(1,0),(1,0),\ldots,(1,0)].$$ [20]

Therefore, L1(k*−(h−1))≦[(u₀, v₀), (u₁, v₁), . . . , (u_{g−1}, v_{g−1}), (u_g, v_g), (u_{g+1}, v_{g+1}), . . . , (u_{g+h−1}, v_{g+h−1})], where (u₀, v₀)=(1,0), (u_j, v_j)=(1,1) for 1≦j≦g−1, (u_j, v_j)=(1,1) for g≦j≦g+h−2, and (u_{g+h−1}, v_{g+h−1})=(0,0). Equivalently, we have:

$$L1(k^* - (h-1)) \leq 2 \times (2^g - 1) - 1 + 2^{g+h-1} = 2^{g+1} - 3 + 2^{g+h-1} - 2^g$$ [21]

But, $$L1(k^*) \leq L1(k^* - (h-1)) + (h-1)^* Q_{max}.$$ [22]

Hence, we have:

$$L1(k^*) \leq L1(k^* - (h-1)) + (h-1)^* Q_{max}$$ [23]
$$\leq 2^{g+1} - 3 + 2^{g+h-1} - 2^g + (h-1)^* Q_{max},$$

and the proof is completed.

As discussed above, the re-normalization method uses numbers g and h, wherein g represents the number of bits needed to represent and store the branch metric value (Q), and h represents the additional number of bits required to represent and store the state metric value (M) in the Viterbi detector 138. Since h represents the additional number of bits required to represent and store the state metric value (M) in the Viterbi detector 138, g+h represents the number of bits required to represent and store the state metric value (M) in the Viterbi detector 138. Using the following re-normalization inequality:

$$2^{g+h'} - [2^{g+1} - 3 + 2^{g+h'-1} - 2^g + (h'-1) \times Q_{max}] \geq D_{max} + 1,$$ [24]

which was obtaining using the above Propositions, we are able to obtain a new value h' for the additional number of bits required to represent and store the state metric value (M), which is less than the value for h found using equation [1] $2^{h-1} - h \geq K - 1$. By using a lower value for h, a Viterbi detector 138 can be designed and fabricated which uses less complex hardware, since the number of bits (g+h) needed to represent and store the state metric value (M) would also be reduced. Reducing the number of bits (g+h) needed to represent and store the state metric value (M), allows us to fabricate Viterbi detector 138 with a smaller latch 232, and with less adders 202 in the adding unit 200, as illustrated in FIG. 2.

More specifically, by using a new, lower value for h', which represents the additional number of bits required to represent and store the state metric value (M), we are able to design and fabricate an addition unit 200 for the Viterbi detector 138 having g+h' number of adders 202, as illustrated in FIG. 2. Additionally, we are able to design and fabricate an addition unit 200 for the Viterbi detector 138 having g+h' number of S latches ($S_i$) 206, g+h' number of C latches ($C_i$) 208, and no more than g+h' number of P latches ($P_i$) 210.

Referring to re-normalization inequality [24], the parameter $D_{max}$ is the maximum difference between Viterbi state metric values over all state pairs and over all time. The parameters $Q_{max}$ and $D_{max}$ can be computed for a given Viterbi detector, as known by those skilled in the art. An example of the computation of $D_{max}$ is described in greater detail in a paper entitled "Exact bounds for Viterbi detector path metric differences," written by P. Siegel, C. Shung, T. Howell, and H. Thapar, Proc. of 1991 IEEE Int. Conf. on Acoustics, Speech, and Signal Proc. (ICASSP'91), in Toronto, on May 14-17, 1991, the entire disclosure of which is incorporated herein by reference.

Nevertheless, the following example of the computation of $Q_{max}$ and $D_{max}$ for a given Viterbi detector 138, is provided. Given a Viterbi detector 138 matched to a signaling target $3+2D-2D^2-2D^3-D^4$, the tradition inequality [1], $2^{h-1} - h \geq K - 1$, wherein K represent the constraint length of the trellis diagram, gives us an h equal to 4. However, using our new re-normalization inequality [24], $2^{g+h} - [2^{g+1} - 3 + 2^{g+h-1} - 2^g + (h-1) \times Q_{max}] \geq D_{max} + 1$, gives us a reduced value for h, h', which is equal to 3. For this example, the value for the parameters $Q_{max}$ and $D_{max}$ from the re-normalization inequality [24] are $Q_{max}$=384, $D_{max}$=750, g=9, and h=3.

Advantages of using the above-described method for state metric re-normalization of the Viterbi detector 138 include: 1) less complex hardware; 2) less delay; and 3) less power consumption for Viterbi detection. More specifically, in one case, a Viterbi detector may be implemented with 12 bit state metric values (M) instead of 13 bit state metric values (M). While the above-described Viterbi detector 138 is described in relation to only one state, the Viterbi detector 138 may have additional states, wherein a state metric value (M) for time k+1, a branch metric value (Q) for time k+1, and a survivor are calculated for each state, as known by those skilled in the art.

It is to be noted that suitable transistor sizes specifying channel width-to-length ratios (measured in micrometers or microns) for the transistors which make up the depicted circuits have been omitted from the figures. It will be appreciated that suitable ratios may be chosen depending on the design requirements and the capabilities and limitations of the particular integrated circuit fabrication process used for implementation of the circuit as well as the performance requirements of the specific embodiment.

Thus, there has been disclosed, a method for Viterbi detector state metric re-normalization for a Viterbi detector of a read/write channel for a hard disk drive that fully provides the advantages set forth above.

Further disclosed herein is an improved Viterbi detector 138 in which each branch metric is calculated based on noise statistics that depend on the signal hypothesis corresponding to the branch. Also disclosed is a method of reducing the complexity of the branch metric calculations by clustering branches corresponding to signals with similar signal-dependent noise statistics. While the disclosed embodiments are discussed in relation to Viterbi detectors used in hard disk read channels, it will be appreciated that the disclosed embodiments may also be used with Viterbi detectors utilized for other purposes such as other recording or communications technologies.

The Viterbi detection algorithm for estimating the transmitted signal in noisy received data is well known. The algorithm uses dynamic programming to compute the maximum likelihood estimate of the transmitted signal from the received data, where the likelihood is computed assuming a particular model of the noise statistics in the received data.

In prior Viterbi detectors, the maximum likelihood estimate of transmitted data is computed assuming that the noise is stationary. In particular, it is assumed that the noise is independent of the transmitted signal. This assumption allows a simplified detector, but with stronger correlations between noise and the transmitted signal, the simplified detector's performance increasingly falls below true maximum likelihood performance.

In recording technologies as practiced today, physical imperfections in the representation of recorded user data in the recording medium itself are becoming the dominate source of noise in the read back data. This noise is highly dependent on what was (intended to be) written in the medium. Prior Viterbi detectors, that assume a stationary noise model, cannot exploit this statistical dependence of the noise on the signal.

Figure 4:
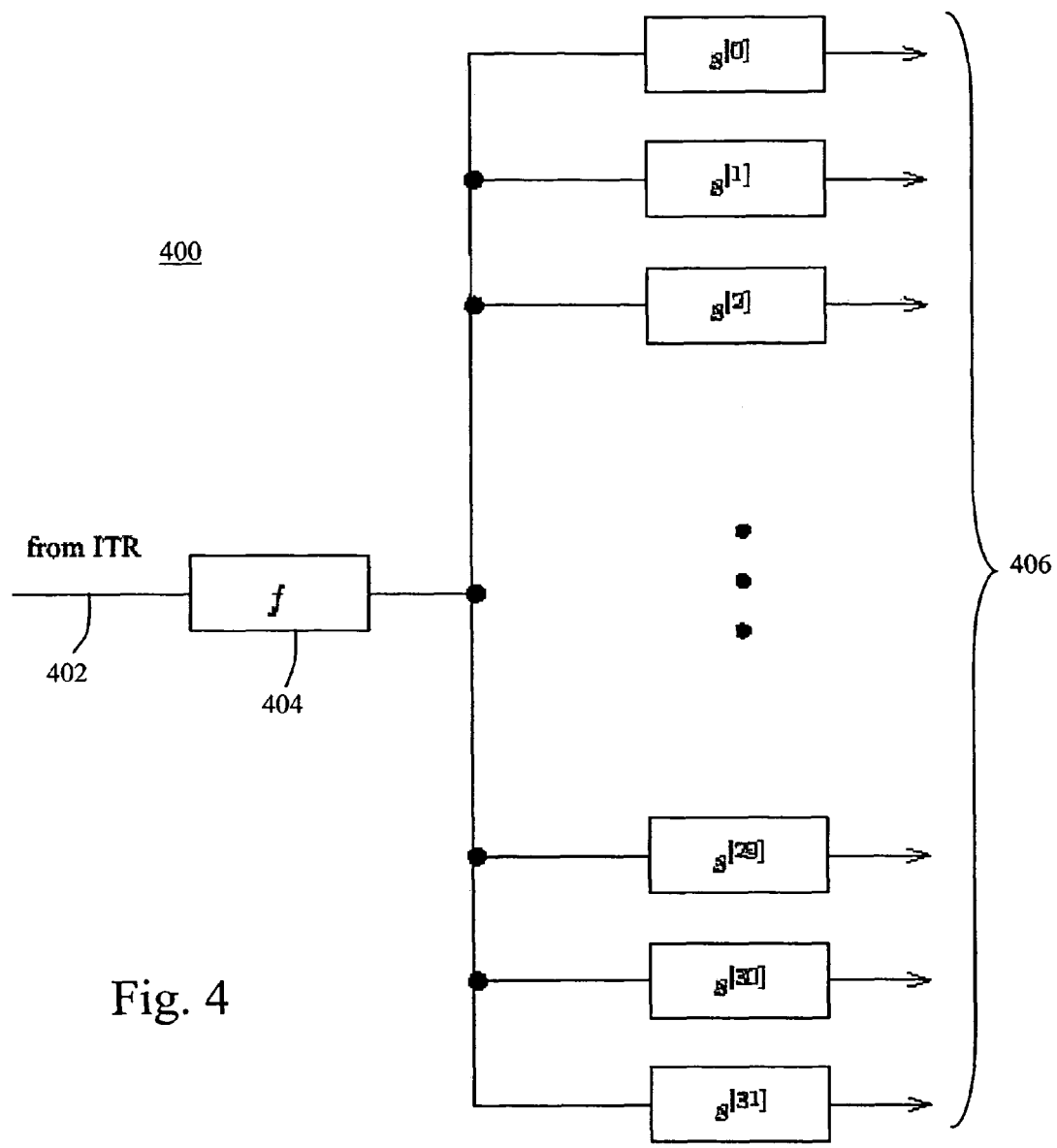
FIG. 4 depicts a block diagram of an exemplary Branch Metric Unit for use with the Viterbi detector of FIG. 2.

In prior Viterbi detectors, a stationary noise model is assumed. This allows the branch metric unit of the Viterbi detector to have the architecture 400 shown in FIG. 4. The input signal 402 to the detector first enters the finite impulse response (FIR) filter 404 labeled f. In the typical case, the filter 404 has a small number of taps whose weights are offline programmable to handle a variety of stationary noise situations. An exemplary three tap 304A-C FIR filter 300 is shown in FIG. 3 which can be used as the filter 404 in FIG. 4. The filter 404 can be regarded as a noise predictive filter for stationary noise. At the output of the FIR filter 404, each possible ideal signal value $e_j$ depends on a block $b_{j-q+1} \ldots b_{j-1} b_j$ of transmitted (or recorded) user bits, q in number. The number q−1 is sometimes referred to as the memory of the ideal signal. In the case illustrated, where the FIR filter 404 has three taps, and where the input signal 402 is equalized to a target with memory two (as is the case for PR4 equalization, for example), then the ideal filter output has memory q−1=4. We focus on this example, though the generalization to other signal memory values is straightforward. We denote the $2^5=32$ corresponding ideal signal values as $e^{[i]}$, where we associate an index $0 \leq i < 32$ with the length 5 input bit string $b_{i-4} \ldots b_{i-1} b_i$ by regarding the string as an unsigned binary expansion with $b_{i-4}$ as the least significant bit. The 32 blocks on the right side of FIG. 4 are square difference operators 406. A given square difference operator 406, labeled $s^{[i]}$, performs the operation $$f_j \mapsto s_j^{[i]} = (f_j - e_j^{[i]})^2.$$

The output $s_j^{[i]}$ is the squared difference between the FIR output $f_j$ and the expected ideal signal $e_j^{[i]}$ given that the user bit sequence indexed by i was transmitted ending at time j. This output becomes the branch metric $m^{[i]}$ in a one-bit-per-cycle Viterbi detector (in which each branch corresponds to one bit cycle). In a two-bits-per-cycle Viterbi detector (in which each branch corresponds to two consecutive signal bits), each branch corresponds to a user bit sequence $b_{j-q} \ldots b_{j-1} b_j$ of length q+1, and the branch metrics are computed as $$m^{[i]} = s^{[i']} + s^{[i'']},$$

where now $0 \leq i < 2^{q+1}$ is the index corresponding to the entire bit sequence $b_{j-q} \ldots b_{j-1} b_j$, while the index $0 \leq i' 2^q$ corresponds to the initial bit sequence $b_{j-q} \ldots b_{j-1}$, and the index $0 \leq i'' < 2^q$ corresponds to the final bit sequence $b_{j-q+1} \ldots b_j$.

Figure 6:
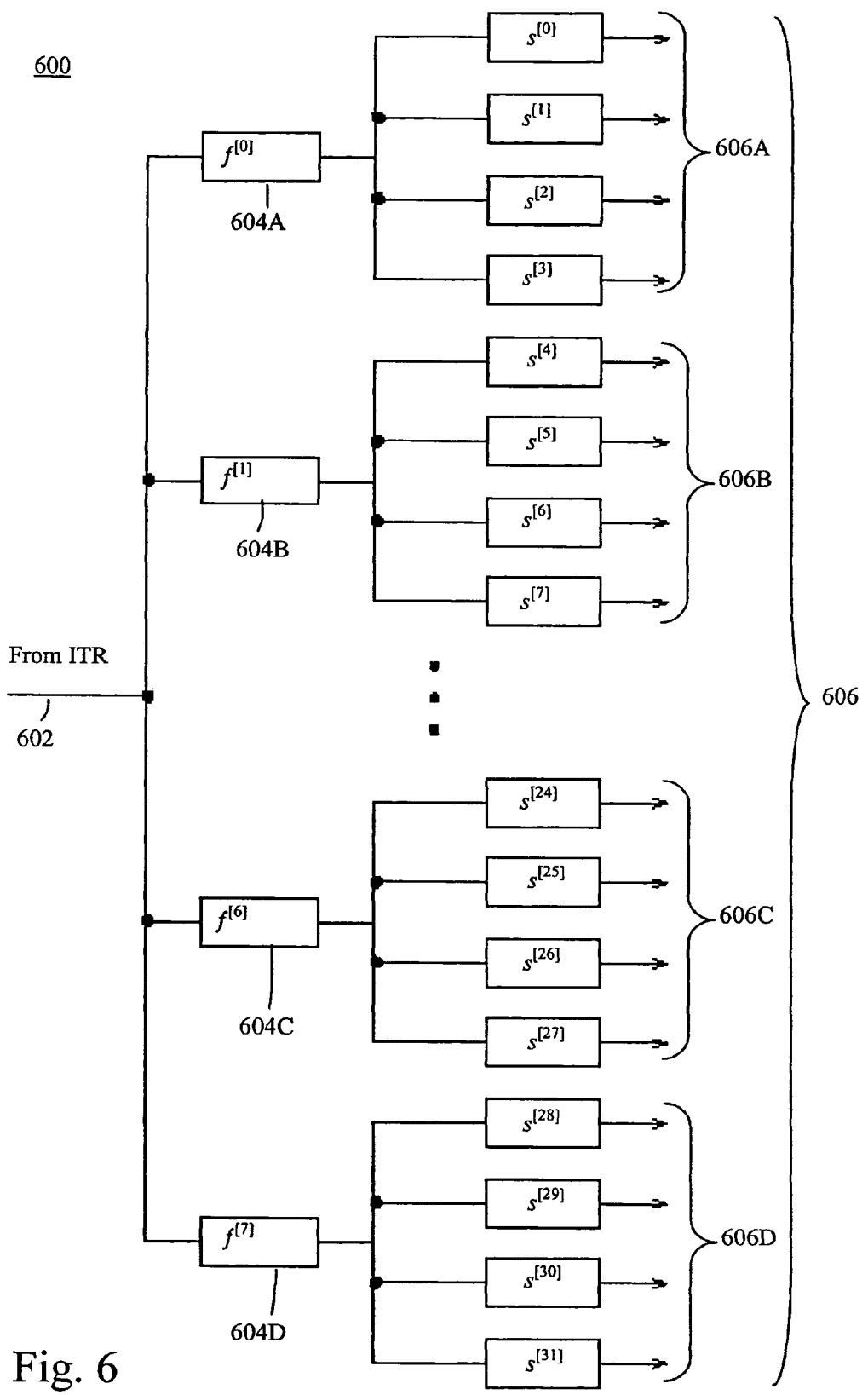
FIG. 6 depicts a block diagram of a Branch Metric Unit for use with the Viterbi detector of FIG. 2 according to one embodiment.

In the Viterbi detector designed for signal dependent noise, the branch metric unit 600 has the architecture illustrated in FIG. 6. A feature of this architecture 600 is that the branch metrics (and their corresponding square difference operators) are clustered into multiple groups 606, where all the members of each group draw input from a single, shared noise predictive filter 604A-D corresponding to the group. In the case illustrated, the 32 branch metrics 606 are divided into eight groups, four of which 608A-D are shown, each group having four members. The branch metric unit for stationary noise prediction shown in FIG. 4 can be regarded as the special case where all of the branch metrics belong to a single group.

More generally, the $2^q$ branch metrics can be divided into $2^r$ groups, each group with $2^p$ members where p=q−r.

Because the correlations between the noise at time j and the transmitted bit at time j−k decreases with increasing k, it is best to cluster branch metrics according to the suffix $b_{j-r+1} \ldots b_{j-1} b_j$ (of some fixed length r≤q) of the corresponding user data bit sequences $b_{j-q+1} \ldots b_{j-1} b_j$. In terms of indices, the clusters become the $2^r$ sets of indices of the form $$\{i : \lfloor i/2^p \rfloor = k\}, 0 \leq k < 2^r.$$

All square difference operators 606 in a group share the output $f^{[k]}$ from a single noise predictive filter 604A-D optimized for the cluster.

It is possible for the noise to have a signal-dependent nonzero mean (bias) that varies from cluster to cluster (i.e., depends on k, $0 \leq k < 2$). The filtered bias $\bar{e}^{[k]}$ can be subtracted from the output of the noise predictive filter 604-A-D for cluster k. This is shown in FIG. 5. The square difference operators are defined in just as they are in the stationary case; each operator calculates the square of the difference between the actual output of the noise predictive FIR and the ideal output expected for the user data sequence i corresponding to the operator. For more detail on how the parameters, such as the taps 504A-C, are computed for the noise predictive filter 500, refer to the above captioned patent application entitled "METHOD AND APPARATUS FOR CALIBRATING DATA-DEPENDENT NOISE PREDICTION" and herein incorporated by reference.

Below are described simulation results and conclusions regarding branch and state metric representation and calculation for a data-dependent noise predictive, parity-pruned Viterbi detector. Further, simulation results on the degree of data conditioning used in noise prediction are also shown below. In addition, the hardware implementation of the noise predictive algorithm is described in detail.

Two simulators were used: one having idealized timing and equalization, the other a fixed point simulator modeling the equalizer, the timing loop and so on. In the fixed point simulator, all the control loop gains were set to their lowest possible nonzero values. The FIR adaptation was disabled.

The signal and noise models for both simulators were the same. We used the Zhang-Bertram signal model, with parameters:

$a_{media}$=0.202
$g_{center-to-shield}$=1.17
$d_{effective}$=0.975
$t_{mr}$=$g_{center-to-shield}$/10.

These settings produced a channel bit density of 2.652. The media noise power was set at half the total noise power for all SNRs.

The ideal simulations used the "4-by-2" noise predictive filter configuration, while the fixed point simulations used the "3-by-1" configuration. Past simulations show that these have nearly equal performance.

Three parameters of quantization were studied: tap precision, tap output rounding, and tap output saturation.

In the ideal simulations, the equalized signal was scaled so that the ideal PR4 signal levels were {32, 0, 32}, and then rounded.

In the fixed point simulations, subtracting the non-zero data-dependent noise mean from the noise before filtering was also tried. In this case, the noise covariance, rather than the correlation, was used to calculate the noise filter taps. Subtracting this bias showed almost no measurable improvement in event error rate.

Figure 7:
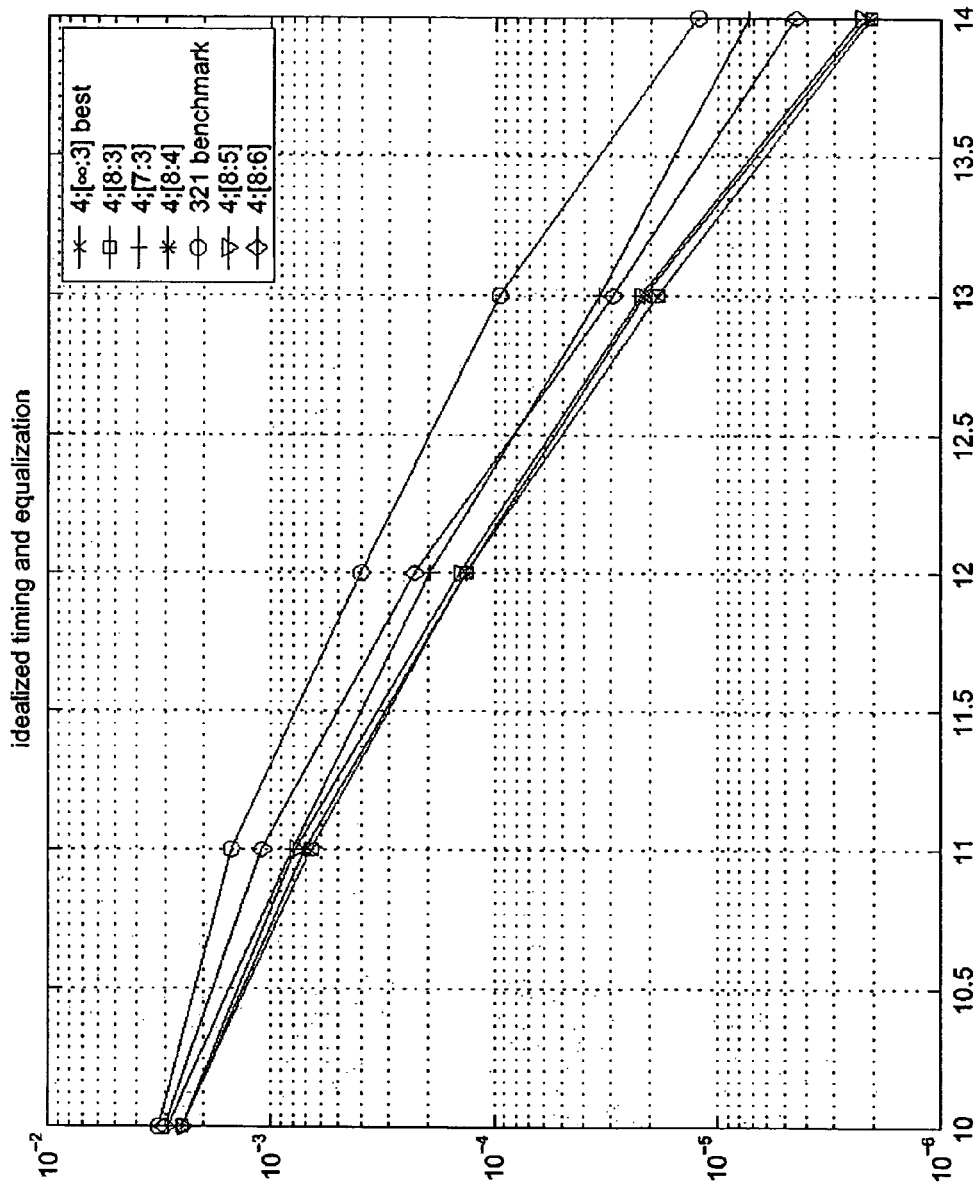
FIG. 7 depicts an exemplary graph showing ideal timing and equalization of the Viterbi detector of FIG. 2 according to one embodiment.
Figure 8:
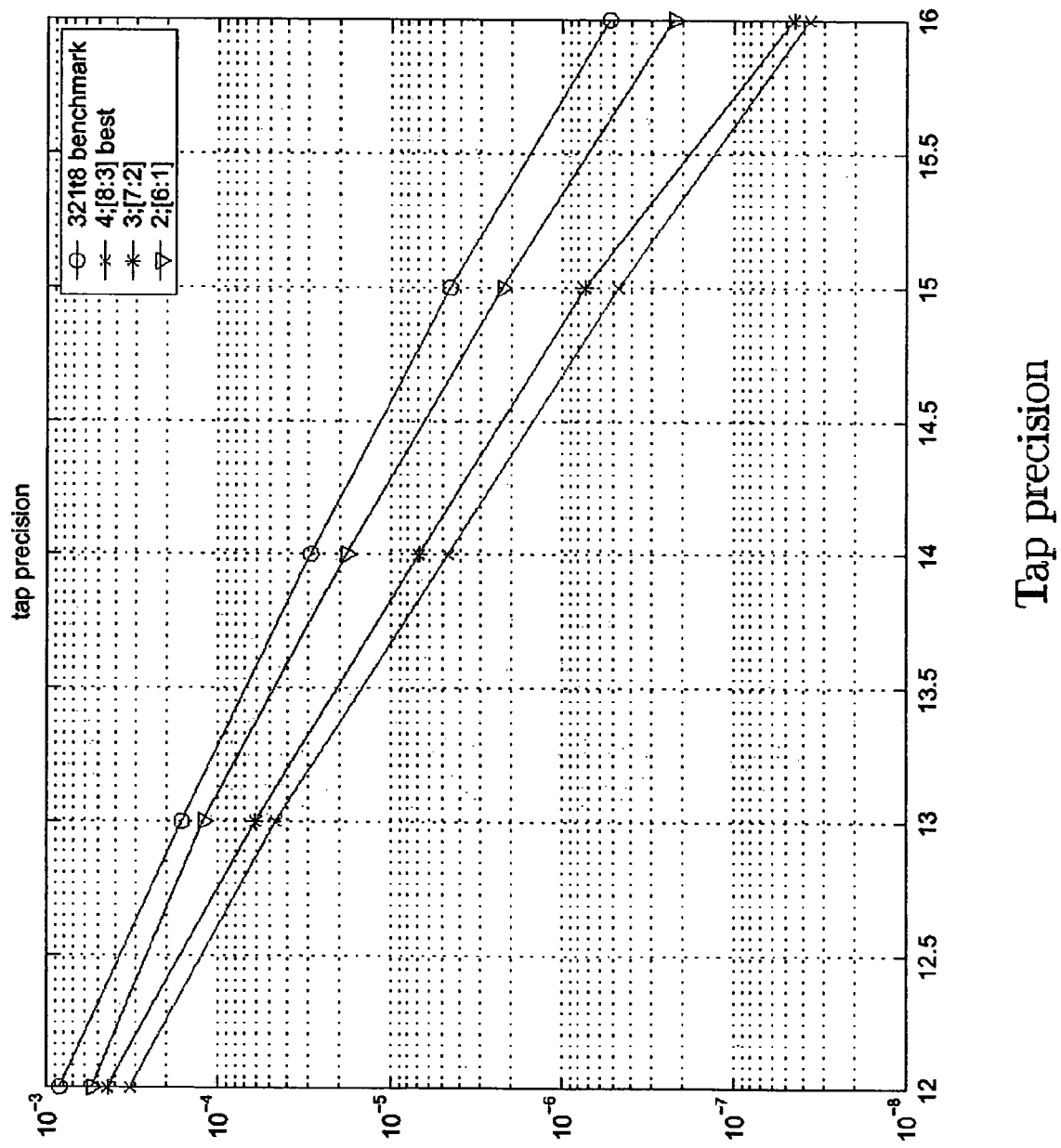
FIG. 8 depicts an exemplary graph showing tap precision of the Viterbi detector of FIG. 2 according to one embodiment.

The event-error-rate versus SNR curves for the ideal timing and equalization simulations are shown in FIG. 7.

The notation a; [b:c] in the legend requires explanation. First, a bits were used to represent the magnitude of the noise predictive taps (so any sign bit is not counted). Second, if the integer output of the filter is represented as bits indexed from most-significant-bit ("MSB") to least-significant-bit ("LSB") as by [n:0], then [b:c] is the remaining mantissa after rounding c LSBs and saturating so as to leave b as the most significant bit (not including the sign).

Note that the case 4;[8:5] shows almost no loss from the best case. The magnitude of the filter output can be represented with 4 bits, so that the accurate square can be represented with unsigned 8 bits. This gives a branch metric (the sum of two squares) of 9 unsigned bits. This is unchanged from prior Viterbi implementations. This implies that the state metric registers can be 12 bits wide as shown below.

Figure 9:
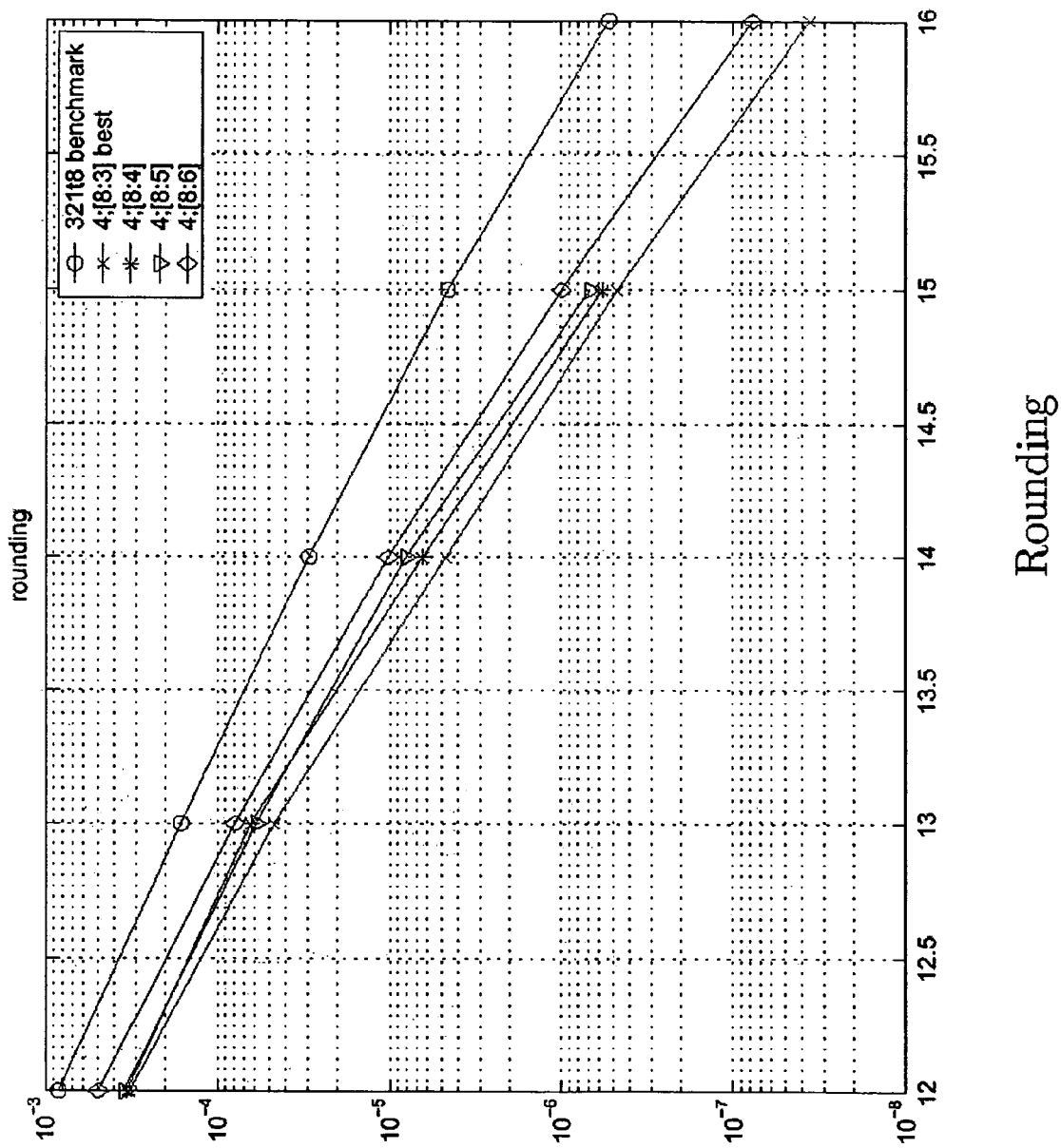
FIG. 9 depicts an exemplary graph showing rounding of the Viterbi detector of FIG. 2 according to one embodiment.
Figure 10:
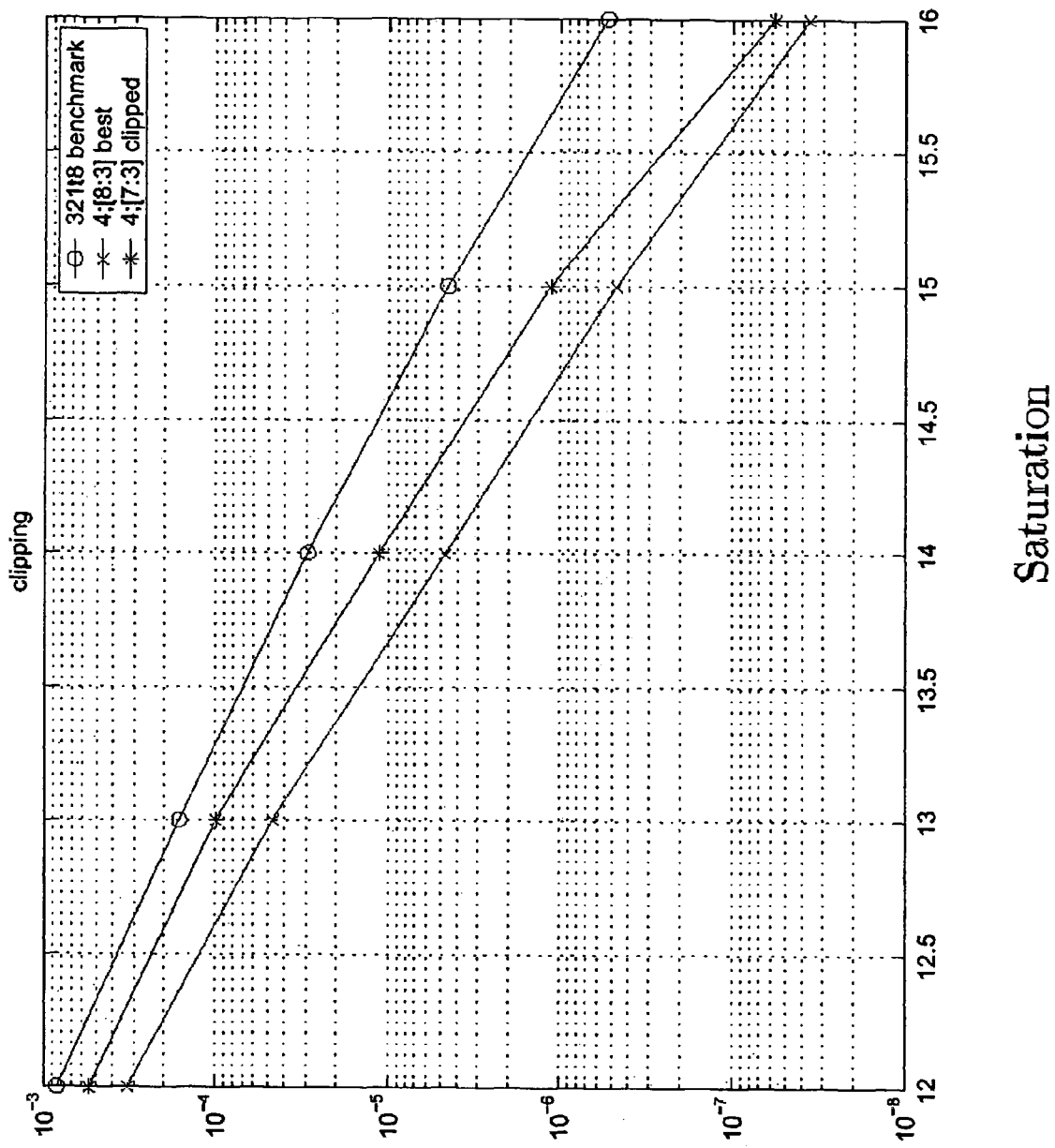
FIG. 10 depicts an exemplary graph showing saturation of the Viterbi detector of FIG. 2 according to one embodiment.

The plots show two points. The 4; [8:5] case appears to lose about 0:1 dB from the best case (see FIG. 9). Second, noise bias compensation just does not seem to help (see FIG. 11).

Following the suggestion above, we will assume that the branch metrics are 9-bit unsigned integers. The point of this section is to prove the following.

Theorem 1. Assume a Fettweis Viterbi detector has a known topology and pruning, and that the branch metric values are confined to $[0;2^k-1]$. Then a width of k+3 bits is sufficient for the carry-save state metric registers so that prior techniques for renormalization work properly.

Thus the fact that twelve-bit state metric registers are large enough for prior Viterbi detectors follows from the topology, pruning, and the register width of the branch metrics alone. This is good: the noise-predictive branch metrics suggested in the preceding section also satisfy these weak hypotheses, so the state metric register width can remain unchanged in a noise-predictive version of a Viterbi detector.

Theorem 1 is proved by making a series of observations.

Define a carry-save counter $c=[c_n; c_{n-1}, \ldots, c_0]$ to be an arbitrarily wide carry-save accumulator into which a single LSB is carried (at bit $c_0$) during each cycle of operation. The notion is introduced because the counter's successive states tell the entire story of how carry bits propagate upward out of the k LSBs of a state metric register (think of $c_0$ as the 10th bit of the state metric register).

Observation 2. The time period between successive carries into bit $c_j$ of a carry-save counter is exactly $2^j$ cycles.

Proof. The proof is by induction on j. The case j=0 is by definition. Suppose that the statement is true for all i with $0 \leq i \leq j$. Let $t_0$ be a time when a bit carries into $c_j+1$. Then at time $t_0-1$, we have $c_j=2$. This means a bit was carried into $c_j$ at time $t_0-1$. By the inductive hypothesis, the next time at which $c_j=2$ is $t_0-1+2\cdot 2^j$. But then the next carry into $c_j+1$ is at time $t_0+2\cdot 2^j$, which concludes the proof.

The remaining observations regard the prior Viterbi detector trellis topology and pruning. These observations will imply an upper bound $\Delta$ on the difference between any two state metrics.

Given a trellis, define its pruned constraint length to be the minimum l such that if a state p precedes any unpruned state along an unpruned path of length l, then it so precedes all unpruned states. Here, by pruned state it is meant a state all of whose incoming paths have been pruned. Thus a state can be pruned indirectly at a later phase by pruning edges (or states) at an earlier phase. Notice the implication: the set $P_s$ of all states situated at the beginning of the unpruned paths of length l that end at an unpruned state s is in fact independent of s.

Observation 3. The prior Viterbi detector trellis with its pruning has pruned constraint length 3

Proof. It will be shown that the pruned constraint length is at most 3, which is really what is needed. The proof that it is exactly 3 is omitted. Suppose state p precedes some unpruned state s along an unpruned path of length l=3. It must be shown that p precedes each unpruned state t along some unpruned path of length 3. Four cases depending on the pruning phase are proved. Define phase 0 to be the phase of the cycle of operation at which the states with odd parity are pruned.

Case 1. States s and t are at some phase other than phases 1, 2, or 3. Then no path of length 3 leading into state t is pruned. So there are exactly 2 paths of length 3 leading from any state to state t.

Case 2. States s and t are at phase 1. The states at phase 1 fall into two classes: those all of whose incoming branches emanate from odd-parity (pruned) states, and those all of whose incoming branches emanate from even-parity (unpruned) states. Since t is itself unpruned, it belongs to the second class. So again, as in case 1, all paths of length 3 leading into state t are unpruned, and we finish as in case 1.

Case 3. States s and t are at phase 2. Again, the states at phase 2 fall into two classes: those all of whose incoming paths of length 2 emanate from pruned states, and those all of whose incoming paths of length 2 emanate from unpruned states. Proceed as in case 2.

Case 4. States s and t are at phase 3. All states at phase 3 have exactly two incoming paths from each of the unpruned states at phase 0. Proceed as in case 1.

Corollary 4. The maximum difference $\Delta$ between state metrics is bounded as $$\Delta \leq 3\delta$$

where $\delta$ is an upper bound on the branch metrics.

Proof. It is assumed that the ACS cycle proceeds by selecting the maximum metric ("big is good" as in the prior Viterbi detector), though the other (more natural) way of selecting winners is just as easy to deal with.

Consider the set of state metrics of unpruned states at time (cycle) i. We can assume that no renormalization takes place in cycles i−3 through i, since such a renormalization has no effect on Δ. Since the pruned constraint length is at most 3, all unpruned states s at time i have the same set P of source states situated at the beginning of unpruned paths of length 3 ending at state s. Let M be the maximum state metric at time i−3 among the states in the set P. Let m' be the minimum state metric among unpruned states at time i, and let M' be the maximum state metric among unpruned states at time i. Then M≦m', since each unpruned state at time i has an incoming path beginning at some state having metric M at time i−3, and the branch metrics (along this path) are non-negative. Also M'≦M+3δ, since this is the maximum accrued metric of any path ending at an unpruned state at time i. Putting this together, gives $$M \leq m' \leq M' \leq M+3\delta.$$

So M−m'≦3δ.

The main result can now be proved.

Proof of Theorem 1. It is assumed that the branch metrics are non-negative and bounded above by $\delta=2^k-1$. Define the carry $\lambda_{ij}(t)$ between the metrics for states i and j at time t to be the difference $$\lambda_{ij}(t)=\gamma_i(t)-\gamma_j(t),$$

where $\gamma_i(t)$ counts the total number of carries into bit $d_k$ of the metric register for state i that occur at or before time t. Note that the difference is bounded.

Now it is shown that $\gamma_j(t) \leq 4$, always. First, the difference between the metrics for states i and j is bounded as $m_i - m_j < 3$ $(2^k-1)$, by Corollary 4. Decompose the state metrics as $m_n = a_n + b_n$, where $a_n$ has the carry-save representation of $m_n$ with its k least significant bits zeroed out, and $b_n$ has the representation of $m_n$ with all but its k least significant bits zeroed out. Using this decomposition, $$|a_i - a_j| \leq |m_i - m_j| + |b_i - b_j|$$
$$\leq |m_i - m_j| + 2(2^k - 1)$$
$$\leq 3(2^k - 1) + 2(2^k - 1)$$
$$= 5(2^k - 1).$$

Now $a_i$ and $a_j$ are both integer multiples of $2^k$. Thus $$|a_i - a_j| \leq 2^k \lfloor 5(2^k - 1)/2^k \rfloor < 5 \cdot 2^k.$$

So $|\lambda_{ij}|=|a_i-a_j|/2^k<5$, as was to be shown.

Thus the lag between the number of carries into bit $d_k$ in the metrics of two unpruned states can be at most 4. Translate this fact into the terms of Observation 2: regarding the most significant state metric bits $[d_n::.\ d_k]$ as a carry-save counter $[c_{n-k} \ldots c_0]$ corresponding to the state, these counters can be out of synchrony by at most 4 counter cycles. Now apply Observation 2. If the counter bit $c_2$ for one state has reached the value 2, then the counter bit $c_2$ for any unpruned state must have at least reached the value 1, since there are exactly 4 counter cycles between successive carries into bit $c_2$ of a counter. This is exactly the condition needed for the prior Viterbi detector renormalization.

Whether to use Data-dependent noise prediction is not an all-or-nothing design choice. The noise predictive filters can be tailored to a greater or lesser degree to the particular sequence of NRZ bits that is hypothesized when calculating any particular branch metric. In the prior Viterbi detector trellis, each branch corresponds to a particular data hypothesis: the hypothesis is simply the particular sequence of 6 nrz bits whose initial 4 bits correspond to the initial state of the branch, and whose final 4 bits correspond to the final state of the branch. Anything from all to none of this hypothesis could conceivably be used to calculate the taps of the two noise predictive filters used on the corresponding branch.

The two noise predictive filters for a particular branch are calculated based on noise correlation data collected during a known-data training phase.

This data is used to calculate an estimate of the 3-by-3 conditional noise correlation matrix for each distinct data condition chosen to be distinguished. The two extreme strategies are: (1) stationary noise prediction, where the single correlation matrix is conditioned on the (single) empty data condition; and (2) data dependent noise prediction where 26 correlation matrices are each conditioned on the entire sequence of 6 NRZ data bits available as a data hypothesis at any particular branch.

TABLE 1

NRZ DATA CONDITIONING

| reference number | condition mask | distinct conditions | squares per condition |
|---|---|---|---|
| 1 | xxxxxx | 64 | 1 |
| 2 | 0xxxxx | 32 | 1 |
| 3 | 00xxxx | 16 | 2 |
| 4 | 000xxx | 8 | 4 |
| 5 | 0000xx | 4 | 8 |
| 6 | 00000x | 2 | 16 |
| 7 | 0xxxx0 | 16 | 2 |
| 8 | 0xxx00 | 8 | 4 |
| 9 | 0xx000 | 4 | 8 |
| 10 | 0x0000 | 2 | 16 |

Other choices between these extremes are possible, and Table 1 summarizes the choices that were simulated.

The condition mask specifies (as x's) which NRZ bits, of the 6 possible, the noise correlation matrices are conditioned on. The earliest bit is on the left, the most recent on the right. Corresponding conditional correlation matrices are those used to compute the three taps for the second (later) noise predictive filter corresponding to a branch. In all but case 1, the taps for the first filter are computed using correlation matrices conditioned on bits that are shifted one place to the left (earlier). This potentially simplifies the hardware, as we will describe in the next section.

The second column gives the number of distinct data conditions. This number gives one measure of implementation complexity, at least in the implementation we will describe in the next section: in most cases, it counts the number of distinct 3-tap FIRs needed.

The third column gives the number of square differences that are computed from each FIR output. In all but case 1, the total number of square differences computed per bit cycle is 32.

One final comment regarding Table 1: the number of distinct conditions for each of the 10 methods can be reduced by a factor of two by collapsing the pairs of conditions having opposite polarity. This amounts to conditioning on the NRZI data rather than the NRZ data. In simulations, the data-dependent (media) noise statistics were polarity invariant. Thus, the performance of methods 6 and 10 are exactly equivalent to stationary noise prediction.

Figure 12:
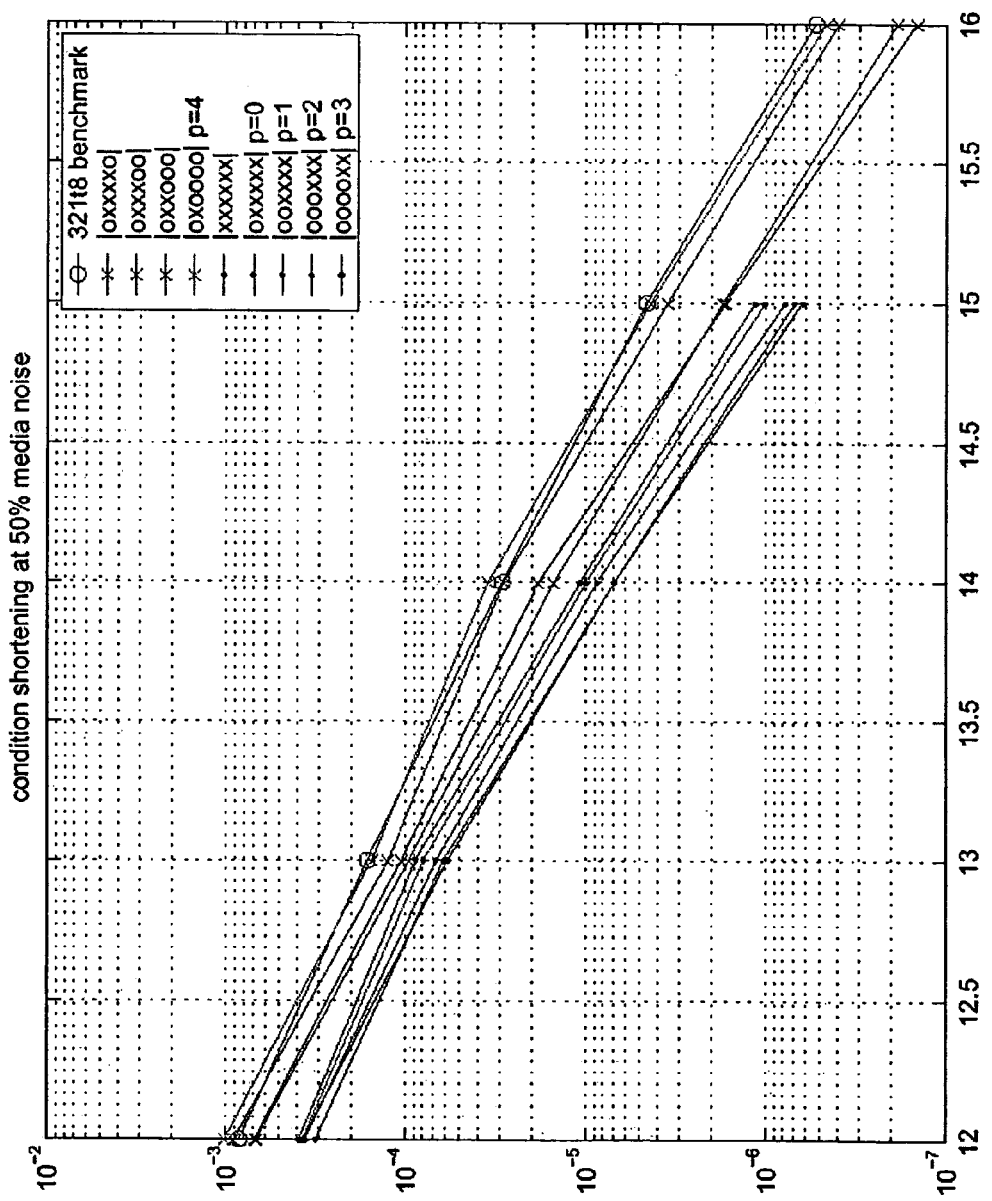
FIG. 12 depicts an exemplary graph showing conditioning in 50% media noise of the Viterbi detector of FIG. 2 according to one embodiment.

FIG. 12 graphs the event error rate as a function of input SNR in the case of 50% media noise.

Figure 13:
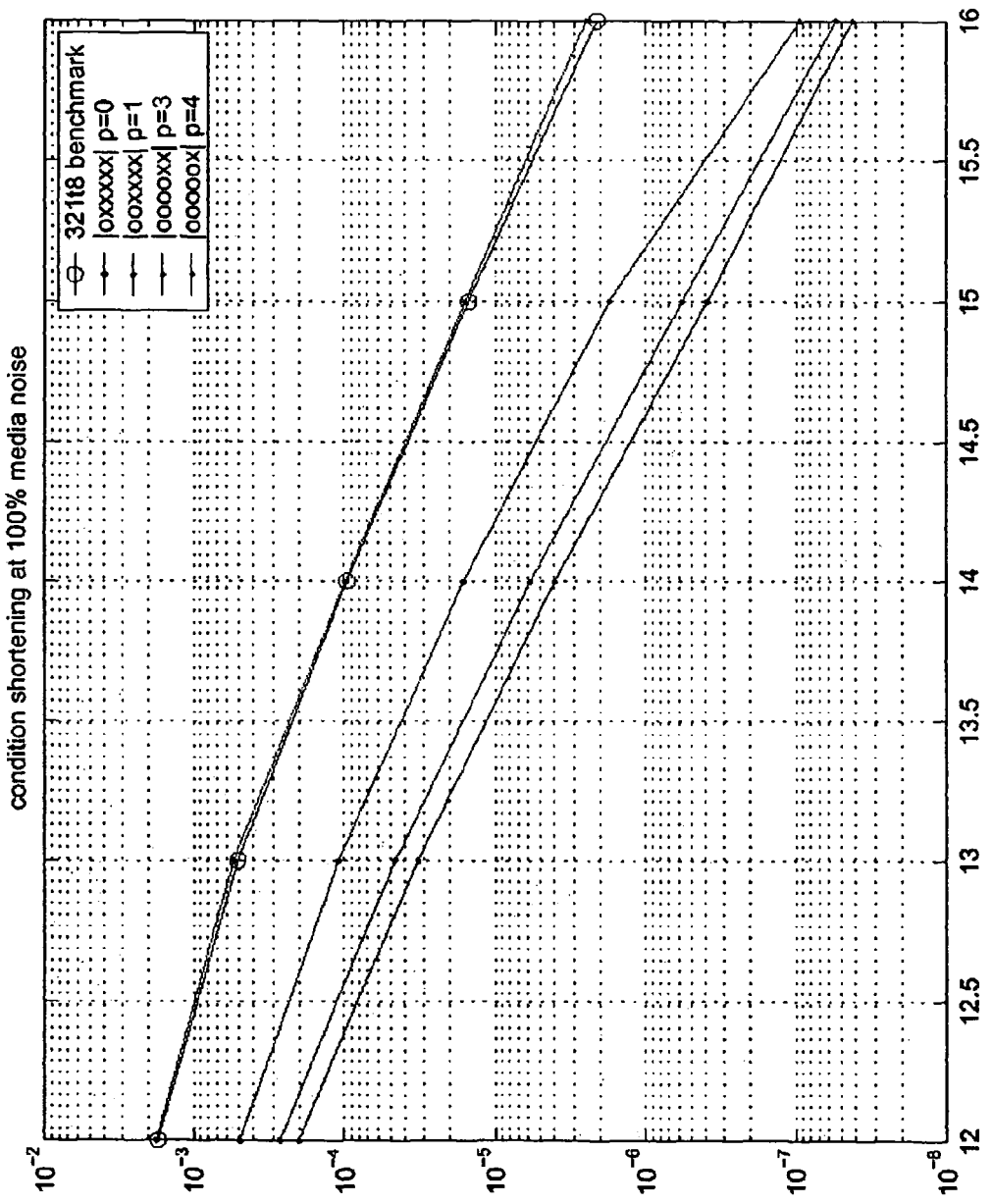
FIG. 13 depicts an exemplary graph showing conditioning in 100% media noise of the Viterbi detector of FIG. 2 according to one embodiment.

FIG. 13 graphs the corresponding curves in the case of 100% media noise for methods 2, 3, 5, and 6.

In each case, the tap precision, and filter output saturation and rounding were done according the scheme 4:[8:5], using the notation of Section 4. It follows that the branch metrics can be represented using 9 unsigned bits, and the state metrics can be represented using 12 unsigned carry-save bits in each case.

By eye-balling FIGS. 12 and 13, Table 2 was filled in, listing the SNR gain over the 321 prior Viterbi detector benchmark at event error rate $10^{-6}$ for each of the ten conditioning methods.

It is apparent that that method 5, with mask ooooxx, outperforms any method not conditioned on both of the two NRZ bits; furthermore, it achieves about ⅔ of the gain of method 1, and this with only two distinct noise predictive filters (in the polarity invariant case).

TABLE 2

SNR Gain over prior Viterbi detector in media noise at error rate $10^{-6}$

| reference number | condition mask | distinct conditions | GAIN OVER PRIOR VITERBI DETECTOR. | |
|---|---|---|---|---|
| | | | 50% | 100% |
| 1 | xxxxxx | 64 | 0.90 | |
| 2 | 0xxxxx | 32 | 0.85 | 1.70 |
| 3 | 00xxxx | 16 | 0.80 | 1.55 |
| 4 | 000xxx | 8 | 0.70 | |
| 5 | 0000xx | 4 | 0.60 | 1.10 |
| 6 | 00000x | 2 | 0.05 | −0.10 |
| 7 | 0xxxx0 | 16 | 0.50 | |
| 8 | 0xxx00 | 8 | 0.45 | |
| 9 | 0xx000 | 4 | 0.15 | |
| 10 | 0x0000 | 2 | 0.05 | |

Each branch metric depends on two filtered noise samples: the earlier and the later. If the condition mask used for computing the taps used to filter the earlier sample is the early-shifted version of the mask used for computing the taps used to filter the later sample, then a single FIR can be employed (at the bit rate) to compute filtered noise samples used both as earlier samples (in even bit cycles) and as later samples (in odd bit cycles). Comparing methods 1 and 2 in Table 2, the performance cost of this simplification appears to be about 0:05 dB in 50% media noise.

In all that follows, this simplification is assumed the discussion is limited to the conditioning methods 2 through 6. Method 1 violates the above simplification, and methods 7 through 10 are under-performers.

In any one of the methods 2 through 6, the $2^r$ distinct conditioning contexts of the form [o ... o $b_0 b_1, \ldots b_{r-1}$] can be indexed with a corresponding index $b_0 + 2b_1 + \ldots + 2^{r-1} b_{r-1}$. This just regards the string of NRZ bits forming the condition as an unsigned integer with the LSB on the left (the earlier end). This indexing is natural and conforms to the branch and state indexing already used in the prior Viterbi detector.

Using this indexing scheme, for each data condition i, $0 \leq i \leq 2^r$, we have a corresponding FIR with taps $[t_2^{[i]}, t_1^{[i]}, t_0^{[i]}]$. If the Viterbi input is denoted as $x_j$ where the subscript indexes time (the bit cycle), then the output of the FIR corresponding to data condition i is $$f_j^{[i]} = t_2^{[i]} x_{j-2} + t_1^{[i]} x_{j-1} + t_0^{[i]} x_j.$$

Just as is implicitly done in the prior Viterbi detector's BMU, expected ideal target values will be subtracted from the output of each of the NP FIRs (rather than from its input). This simplifies the hardware in two ways. First, there is no need to subtract a different sequence of ideal target values for each of the 32 different NRZ bit sequences of length 5 (actually there are just 21 distinct PR4 sequences of length 3, but this is still sizeable). Second, if the number of distinct data conditions is $2^r$ where r<q, then the output of each single FIR can be used to calculate $2^p = 2^{q-r}$ square differences (this is the p in the legends of FIGS. 12 and 13). Each of the $2^p$ square differences corresponding to a single FIR has its own ideal target. For the example where q=5, if we index each of the 32 NRZ sequences $[b_0 b_1 \ldots b_4]$ of length five with the corresponding index $b_0 + 2b_1 + \ldots + 2^4 b_4$, then the square difference corresponding to sequence i is computed (ideally, not considering saturation and rounding) as $$s_j^{[i]} = (f_j^{[i']} - e^{[i]})^2$$

where $$i' = \lfloor i/2^p \rfloor$$

and the ideal target value $e^{[i]}$ is offline computed as $$e^{[i]} = t_2^{[i']} v_{-2}^{[i]} + t_1^{[i']} v_{-1}^{[i]} + t_0^{[i']} v_0^{[i]}.$$

from the sequence of targets $[v_{-2}^{[i]}, v_{-1}^{[i]}, v_0^{[i]}]$ expected when the sequence of five NRZ bits indexed by i is transmitted. It is important to realize that $e^{[i]}$ can be computed once and for all once the NP FIR taps are settled on.

Figure 11:
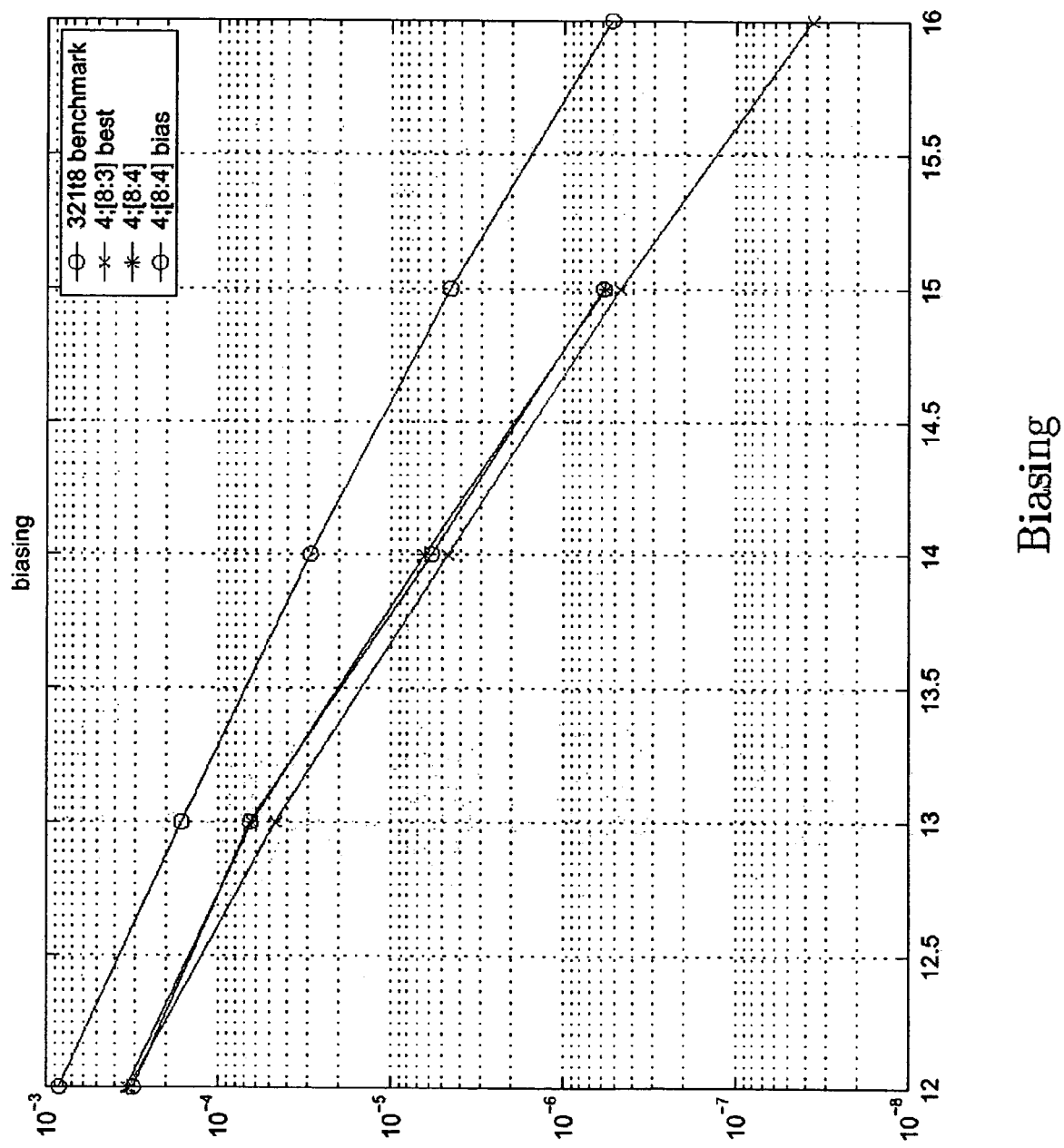
FIG. 11 depicts an exemplary graph showing biasing of the Viterbi detector of FIG. 2 according to one embodiment.

As evidenced by FIG. 11, subtracting a data-dependent noise mean before squaring does not seem to improve performance. Here we consider the complexity cost of noise bias compensation. Denote the sequence of data-dependent noise means expected under NRZ condition i' at the input to the NP FIRs by $[\mu_{-2}^{[i']}, \mu_{-1}^{[i']}, \mu_0^{[i']}]$. This, like the noise correlations, would be estimated offline (during training). The only wrinkle needed to account for the non-zero noise means is to change the offline computation of the expected filtered target $\hat{e}^{[i]}$:

$$\hat{e}^{[i]} = t_2^{[i']}(v_{-2}^{[i]} + \mu_{-2}^{[i']}) + t_1^{[i']}(v_{-1}^{[i]} + \mu_{-1}^{[i']}) + t_0^{[i']}(v_0^{[i]} + \mu_0^{[i']}).$$

This might seem runtime cost-free, but consider rounding. If we stick to the prior Viterbi detector's ideal PR4 targets {−32; 0; 32}, then the calculation of the difference $$f_j^{[i']} - \hat{e}^{[i]}$$

can be done after rounding off as many as 5 bits from each of the two terms without any sacrifice in accuracy (versus rounding after the difference). This is only because $\hat{e}^{[i]}$, when calculated without biases, is really a multiple of 32.

The cost of calculating the unrounded difference $f_j^{[i']} - \hat{e}^{[i]}$ can be mitigated in the case where the output from a single noise predictive filter is used by multiple square difference operators (this happens when p>0). The idea is to decompose $\hat{e}^{[i]}$ into two terms $$\hat{e}^{[i]} = e^{[i]} + \bar{e}^{[i]},$$

where $$e^{[i]} = t_2^{[i']} v_{-2}^{[i]} + t_1^{[i']} v_{-1}^{[i]} + t_0^{[i']} v_0^{[i]},$$

is the filtered ideal target, and $$\bar{e}^{[i]} = t_2^{[i']} \mu_{-2}^{[i']} + t_1^{[i']} \mu_{-1}^{[i']} + t_0^{[i']} \mu_0^{[i']}),$$

is the filtered noise bias. The difference becomes $$(f_j^{[i']} - \hat{e}^{[i']}) - e^{[i]}.$$

Now there is only one high-precision difference per noise predictive filter. This can be rounded before subtracting the filtered target term $e^{[i]}$.

As mentioned above, in the case of q=5 for a two-bits-per-cycle Viterbi detector, each branch corresponds to an NRZ bit sequence of length six. Index these by regarding them, as above, as unsigned integers, with the LSB as the earliest bit. Now a branch metrics is calculated every two bit cycles. Assume that the square differences $s_j^{[i]}$ are cycle-indexed so that j is even for the earlier square difference of a branch (and odd on the later square difference). Then the branch metric $m_j^{[i]}$ for Viterbi-cycle j and length six NRZ sequence i is computed as the sum of two square differences:

$$m_j^{[i]} = s_{2j}^{[i']} + s_{2j+1}^{[i'']},$$

where $$i' \equiv i \pmod{2^5},$$

and $$i'' \equiv \lfloor i/2 \rfloor.$$

Figure 14:
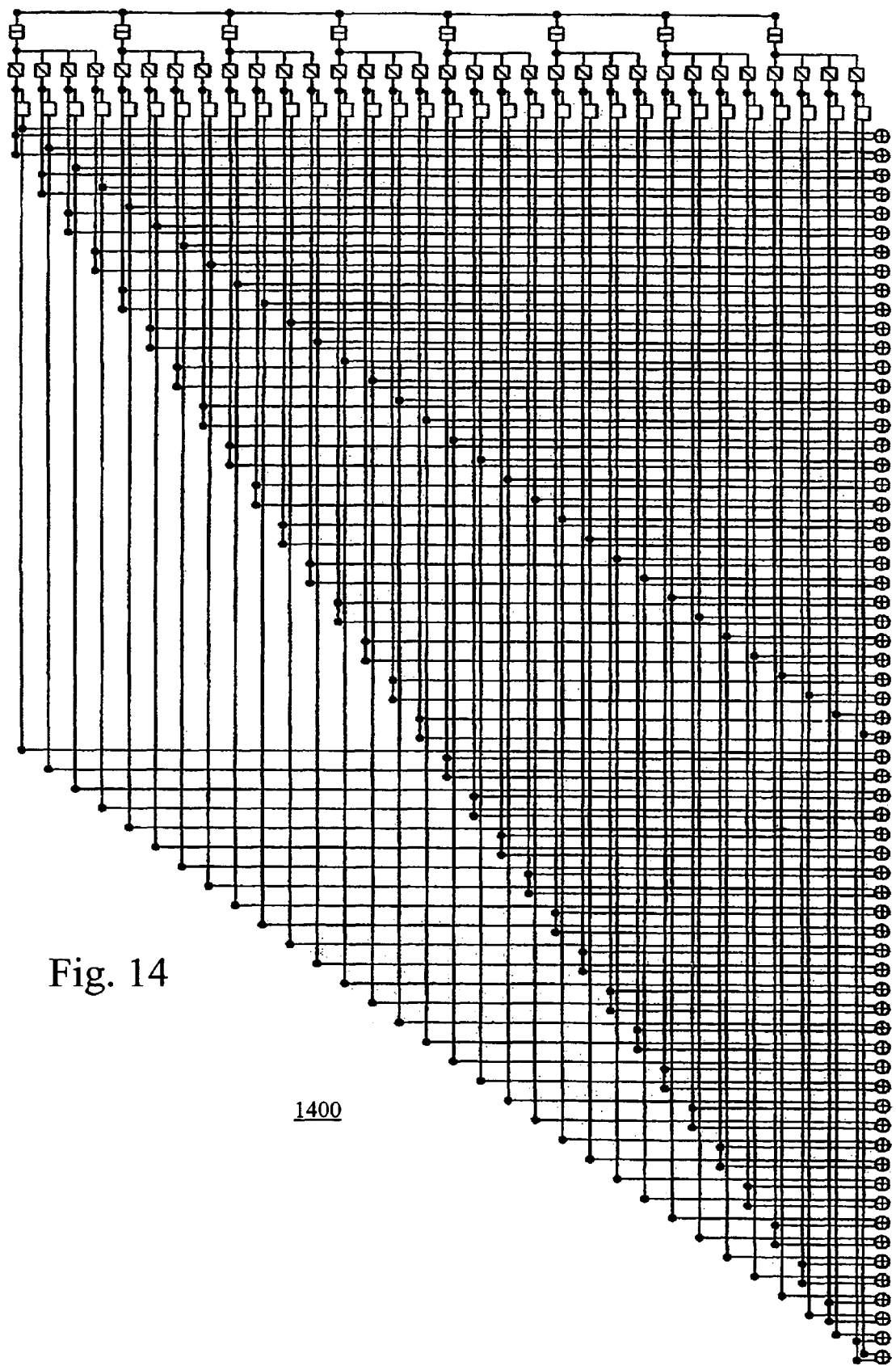
FIG. 14 depicts a block diagram of a Branch Metric Unit according to one embodiment.

It follows from this that each output (at each bit cycle) of any square difference operator is used in two distinct branch metric calculations. This is illustrated in FIG. 14. The 32 distinct square difference operators calculating $s^{[0]}$ through $s^{[31]}$ are depicted as the row of 32 blocks (with diagonal) from left to right across the top of the block diagram. The square difference operators operate on a full-speed clock. The 64 circles with pluses represent the adders computing the 64 branch metrics $m^{[i]}$, $0 \leq i < 64$, from top to bottom down the right side of the diagram. These adders operate on a half-speed clock.

Figure 15:
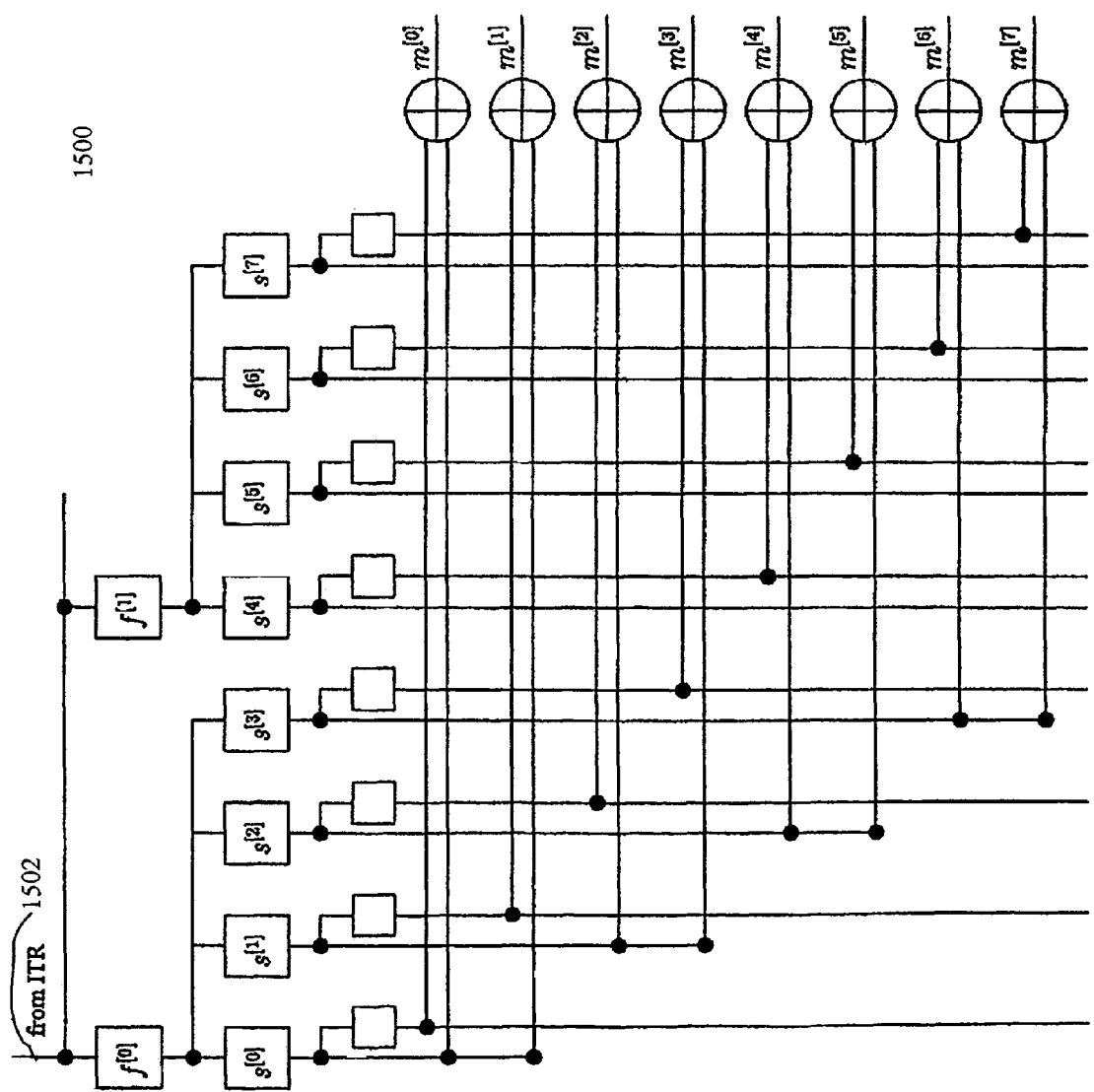
FIG. 15 depicts a more detailed block diagram of the Branch Metric Unit of FIG. 14.

Finally, FIG. 15 gives a more detailed view of part of the BMU, illustrating how each FIR output is used $2^p$ times (p=2 is the case illustrated).

Adaptive vs. Calibration based training. It will be appreciated that the disclosed embodiments do not utilize an adaptive approach involving a feed back loop, wherein the Viterbi detector output data, together with the delayed Viterbi input data is used to compute noise statistics, which in turn are used to compute the coefficients/parameters of the branch metric functions to be applied in subsequent Viterbi time steps. In contrast, the disclosed embodiments, rather than trying to adapt branch metric functions while reading actual user data, use a dedicated training and calibration process to determine the parameters of the branch metric functions to be used in later READ operations. In particular, as opposed to the parameters of the branch metric functions being updated/changed during a READ operation, the disclosed methods assign the parameters of the branch metric functions prior to any READ operations and these parameters are not updated or changed while user data is being read. Further, in contrast to computing noise statistics using estimates of the written data, in particular, the output data of the Viterbi detector, the disclosed embodiments compute noise statistics based on a known data sequence. In particular a well defined pseudo random data pattern is generated using a Linear Feedback Shift Register ("LFSR") and written to the disc. This data pattern is regenerated using the same LFSR and synchronized to the data samples while reading the previously written sequence. The Viterbi detector is not used/needed at all to determine expected data for the noise statistic computation.

Branch Metric Functions. Known correlation sensitive branch metric functions consist out of a square term and a logarithmic term, where the square term is computed using the filtered differences of data samples and ideal (noise free) samples associated with the respective branch. The output data of such a filter is squared and scaled. Finally the logarithmic term is added to build the metric value. In contrast, the disclosed embodiments separate target and sample processing. In particular, as the disclosed embodiments use a calibration method rather than an adaptive approach, the filter coefficients are defined and constant when a READ operation is started. Therefore, it is possible to compute the targets in advance as part of the calibration process, where target refers to the filtered ideal samples. This way, only the data samples need to be passed through a filter while the pre-computed target is subtracted from the filter output and the number of real time difference operations can be reduced by n−1, where n is the number of filter taps. Furthermore, this structure supports filter sharing. With regards to noise bias compensation, the mean of the noise samples might be non-zero and depending on the data pattern, thereby imposing a data dependent bias. The disclosed embodiments correct for this bias by subtracting the filtered noise means from the filtered data samples (See FIG. 5). Again, it is not required to actually implement a filter for real time processing, since the filtered noise means can be computed in advance as part of the calibration process. Further, the branch metric functions of the disclosed embodiments do not contain any additive logarithmic term.

Reduced Order/Complexity. Prior methods required a separate filter to be implemented for each branch metric. The disclosed embodiments introduce the concept of condition masks to provide a concise method to reduce the number of filters required for real time branch metric computation by trading performance against hardware complexity. The number of distinct filters can be further reduced by a factor of two by collapsing the pairs of conditions having opposite polarity. The concept of condition masks cannot be applied to prior adaptive methods, described above. If the branch metric parameters, in particular the filter coefficients, keep changing during the READ operation, it is not possible to share a filter, since the ideal samples associated with distinct branches are different and the respective targets are to be computed at the same time in parallel thereby requiring as many implementations of the filter as there are branches sharing the same filter coefficients. Further, prior methods did not disclose the concept of collapsing pairs of conditions having opposite polarity.

It is therefore intended that the foregoing detailed description be regarded as illustrative rather than limiting, and that it be understood that it is the following claims, including all equivalents, that are intended to define the spirit and scope of this invention.

We claim:

1. A method of architecting a detector for decoding an encoded sequence of data values to be received by the detector over a plurality of time increments, the method comprising:

determining, based on a number of stages of an encoder which produces the encoded sequence of data values, a plurality of possible states of the encoder as a function of a plurality of possible input values which may be received by the encoder;

determining a metric for each possible transition from each of the plurality of the possible states at a first time increment of the plurality of time increments to each of the plurality of possible states at a next subsequent time increment of the plurality of time increments based on each possible data value of the encoded sequence of data values which may be received at the next subsequent time increment;

determining a first least number of binary digits capable of representing a first maximum value of the determined metrics;

determining a maximum difference between a first accumulation of a first consecutive subset of the determined metrics and a second accumulation of a second consecutive subset of the determined metrics, the second consecutive subset being inclusive of the first consecutive subset;

determining a second least number of binary digits capable of representing a maximum accumulation of any consecutive subset of the determined metrics, the second least number of binary digits being the sum of the first least number of binary digits plus a third least number of binary digits; and determining the third least number of binary digits based on the maximum difference, the first maximum value and the first least number of binary digits.

2. The method of claim 1 wherein the third least number of binary digits is less than a fourth least number of binary digits determined based on the number of stages of the encoder.

3. The method of claim 1 wherein the fourth least number of binary digits (h) is determined using the following inequality: $2^{h-1} - h \geq K - 1$, wherein K represents the number of stages of the encoder.

4. The method of claim 1 wherein the third least number of binary digits (h') is determined based on the following inequality:

$$2^{g+h'} - [2^{g+1} - 3 + 2^{g+h'-1} - 2^g + (h'-1) \times Q_{max}] \geq D_{max} + 1$$

wherein $D_{max}$ represents the maximum difference and $Q_{max}$ represents the first maximum value.

5. The method of claim 1 wherein the determining of the plurality of possible states of the encoder further comprises determining a trellis diagram having a constraint length equal to the number of stages of the encoder.

6. The method of claim 1 wherein the metrics comprise branch metrics.

7. The method of claim 1 wherein the first, second and maximum accumulations comprises state metrics.

8. The method of claim 1, further comprising constructing an add-compare-select unit for the detector which can support the maximum accumulation represented by the second least number of binary digits.

9. The method of claim 8, further comprising constructing an adding unit for the detector, wherein the adding unit comprises a number of adders equal to the second least number of binary digits.

10. The method of claim 8, further comprising constructing an adding unit comprising a number of save latches which store save bits and a number of carry latches which store carry bits, wherein the number of save latches is equal to the second least number of binary digits and the number of carry latches is equal to the second least number of binary digits.

11. A system for fabricating a detector for decoding an encoded sequence of data values to be received by the detector over a plurality of time increments, the method comprising:

means for determining, based on a number of stages of an encoder which produces the encoded sequence of data values, a plurality of possible states of the encoder as a function of a plurality of possible input values which may be received by the encoder;

means for determining a metric for each possible transition from each of the plurality of the possible states at a first time increment of the plurality of time increments to each of the plurality of possible states at a next subsequent time increment of the plurality of time increments based on each possible data value of the encoded sequence of data values which may be received at the next subsequent time increment;

means for determining a first least number of binary digits capable of representing a first maximum value of the determined metrics;

means for determining a maximum difference between a first accumulation of a first consecutive subset of the determined metrics and a second accumulation of a second consecutive subset of the determined metrics, the second consecutive subset being inclusive of the first consecutive subset;

means for determining a second least number of binary digits capable of representing a maximum accumulation of any consecutive subset of the determined metrics, the second least number of binary digits being the sum of the first least number of binary digits plus a third least number of binary digits; and means for minimizing the third least number of binary digits such that the third least number of binary digits is less than a fourth least number of binary digits determined based on the number of stages of the encoder.

12. The method of claim 11 wherein the means for minimizing further comprises means for determining the third least number of binary digits based on the maximum difference, the first maximum value and the first least number of binary digits.

13. A detector for decoding an encoded sequence of data values to be received by the detector over a plurality of time increments, the encoded sequence of data having been encoded by an encoder having a number of stages and thereby a plurality of possible states of the encoder as a function of the possible input values which may be received by the encoder, the detector comprising:

a memory for storing a plurality of state metric values, the memory including a first number of bits for each of a plurality of metric values, wherein the first number of bits is a sum of a first least number of binary digits capable of representing a first maximum value of the metric values determined for each possible transition from each of the plurality of the possible states at a first time increment of the plurality of time increments to each of the plurality of possible states at a next subsequent time increment of the plurality of time increments based on each possible data value of the encoded sequence of data values which may be received at the next subsequent time increment and a second least number of binary digits computed based on a maximum difference between a first accumulation of a first consecutive subset of the determined metric values and a second accumulation of a second consecutive subset of the determined metric values, the second consecutive subset being inclusive of the first consecutive subset, the first maximum value and the first least number of binary digits, the first number of bits capable of representing a maximum accumulation of any consecutive subset of the determined metrics.

14. The detector of claim 13, wherein the second least number of binary digits is less than a third least number of binary digits determined solely based on the number of stages of the encoder.

15. The detector of claim 13, further comprising an add-compare-select unit for the detector constructed to support the maximum accumulation represented by the first number of bits.

16. The detector of claim 15, wherein the add-compare-select unit further comprises an adding unit having a number of adders equal to the first number of bits.

17. The detector of claim 15, wherein the add-compare-select unit further comprises an adding unit having a number of save latches which store save bits and a number of carry latches which store carry bits, wherein the number of save latches is equal to the first number of bits and the number of carry latches is equal to the first number of bits.

18. An apparatus for architecting a detector operative to decode an encoded sequence of data values to be received by the detector over a plurality of time increments, the apparatus comprising:
a state calculator operative to determine, based on a number of stages of an encoder which produces the encoded sequence of data values, a plurality of possible states of the encoder as a fiction of a plurality of possible input values which may be received by the encoder;
a metric calculator coupled with the state calculator and operative to calculate a metric for each possible transition from each of the plurality of the possible states at a first time increment of the plurality of time increments to each of the plurality of possible states at a next subsequent time increment of the plurality of time increments based on each possible data value of the encoded sequence of data values which may be received at the next subsequent time increment;
a first binary placeholder calculator coupled with the metric calculator and operative to calculate a first least number of binary digits capable of representing a first maximum value of the determined metrics;
a difference calculator coupled with the metric calculator and operative to calculate a maximum difference between a first accumulation of a first consecutive subset of the determined metrics and a second accumulation of a second consecutive subset of the determined metrics, the second consecutive subset being inclusive of the first consecutive subset;
a second binary placeholder calculator coupled with the metric calculator and operative to calculate a second least number of binary digits capable of representing a maximum accumulation of any consecutive subset of the determined metrics, the second least number of binary digits being the sum of the first least number of binary digits plus a third least number of binary digits; and
a third binary placeholder calculator coupled with the first binary placeholder calculator, the difference calculator and the second binary placeholder calculator and operative to calculate the third least number of binary digits based on the maximum difference, the first maximum value and the first least number of binary digits.

19. The apparatus of claim 18 wherein the third least number of binary digits is less than a fourth least number of binary digits calculated based on the number of stages of the encoder.

20. The apparatus of claim 19 wherein the fourth least number of binary digits (h) is calculated using the following inequality: $2^{h-1} - h \geq K - 1$, wherein K represents the number of stages of the encoder.

21. The apparatus of claim 18 wherein the third least number of binary digits (h') is calculated based on the following inequality:

$$2^{g+h'} - [2^{g-1} - 3 + 2^{g+h'-1} - 2^g + (h'-1) \times Q_{max}] \geq D_{max} + 1$$

wherein $D_{max}$ represents the maximum difference and $Q_{max}$ represents the first maximum value.

22. The apparatus of claim 18 wherein the state calculator is further operative to calculate a trellis diagram having a constraint length equal to the number of stages of the encoder.

23. The apparatus of claim 18 wherein the metrics comprise branch metrics.

24. The apparatus of claim 18 wherein the first, second and maximum accumulations comprises state metrics.

25. The apparatus of claim 18, further comprising an add-compare-select unit constructor operative to construct an add-compare-select unit for the detector which can support the maximum accumulation represented by the second least number of binary digits.

26. The apparatus of claim 25, wherein the add-compare-select unit constructor is further operative to construct an adding unit for the detector, wherein the adding unit comprises a number of adders equal to the second least number of binary digits.

27. The apparatus of claim 25, wherein the add-compare-select unit constructor is further operative to construct an adding unit comprising a number of save latches which, store save bits and a number of carry latches which store carry bits, wherein the number of save latches is equal to the second least number of binary digits and the number of carry latches is equal to the second least number of binary digits.

28. A system for allocating resource requirements for a detector operative to decode an encoded sequence of data values to be received by the detector over a plurality of time increments, the encoded sequence of data having been encoded by an encoder having a number of stages and thereby a plurality of possible states of the encoder as a function of the possible input values which may be received by the encoder, the system comprising:
a memory allocator operative to allocate a minimum amount of memory for storing a plurality of state metric values, the minimum amount of memory being sufficient to store a first number of bits for each of a plurality of metric values, wherein the first number of bits is a sum of a first least number of binary digits capable of representing a first maximum value of the metric values determined for each possible transition from each of the plurality of the possible states at a first time increment of the plurality of time increments to each of the plurality of possible states at a next subsequent time increment of the plurality of time increments based on each possible data value of the encoded sequence of data values which may be received at the next subsequent time increment and a second least number of binary digits computed based on a maximum difference between a first accumulation of a first consecutive subset of the determined metric values and a second accumulation of a second consecutive subset of the determined metric values, the second consecutive subset being inclusive of the first consecutive subset, the first maximum value and the first least number of binary digits, the first number of bits capable of representing a maximum accumulation of any consecutive subset of the determined metrics.

29. The system of claim 28, wherein the second least number of binary digits is less than a third least number of binary digits determined solely based on the number of stages of the encoder and thereby the minimum amount of memory sufficient to store the first number of bits for each of the plurality of metric values is less than the minimum amount of memory to store a number of bits equal to the third least number of binary digits plus the first least number of binary digits for each of the plurality of metric values.

30. The system of claim 28, further comprising an add-compare-select unit allocator for the detector operative to allocate a number of adders for an add-compare-select unit equal to the first number of bits.

31. The system of claim 28, further comprising an add-compare-select unit allocator for the detector operative to allocate a number of save latches which store save bits and a number of carry latches which store carry bits, for an adding unit of an add-compare-select unit, wherein the number of save latches is equal to the first number of bits and the number of carry latches is equal to the first number of bits.

* * * * *